United States Patent
Daykin et al.

(10) Patent No.: US 11,669,729 B2
(45) Date of Patent: Jun. 6, 2023

(54) MODEL TRAINING METHOD AND APPARATUS

(71) Applicant: Canon Medical Systems Corporation, Otawara (JP)

(72) Inventors: Matthew Daykin, Edinburgh (GB); Ian Poole, Edinburgh (GB)

(73) Assignee: Canon Medical Systems Corporation, Otawara (JP)

( * ) Notice: Subject to any disclaimer, the term of this patent is extended or adjusted under 35 U.S.C. 154(b) by 789 days.

(21) Appl. No.: 16/585,800

(22) Filed: Sep. 27, 2019

(65) Prior Publication Data

US 2021/0097381 A1    Apr. 1, 2021

(51) Int. Cl.
| | |
|---|---|
| *G06N 3/08* | (2023.01) |
| *G06N 3/04* | (2023.01) |
| *G06F 11/34* | (2006.01) |
| *G06N 20/00* | (2019.01) |
| *G06N 3/045* | (2023.01) |

(52) U.S. Cl.
CPC ............ *G06N 3/08* (2013.01); *G06F 11/3495* (2013.01); *G06N 3/04* (2013.01); *G06N 3/045* (2023.01); *G06N 20/00* (2019.01)

(58) Field of Classification Search
CPC ............ G06N 3/08; G06N 3/04; G06N 3/045; G06N 3/88; G06N 20/00; G06F 11/3495; G06F 11/34
See application file for complete search history.

(56) References Cited

U.S. PATENT DOCUMENTS

| | | | |
|---|---|---|---|
| 10,936,947 B1 * | 3/2021 | Flunkert | G06N 3/0445 |
| 2010/0020943 A1 | 1/2010 | Hasegawa | |
| 2018/0247159 A1 | 8/2018 | Gu | |
| 2019/0114537 A1 * | 4/2019 | Wesolowski | G06N 3/105 |
| 2020/0303078 A1 * | 9/2020 | Mayhew | G06N 3/08 |
| 2020/0357118 A1 * | 11/2020 | Yao | G06V 10/764 |

(Continued)

FOREIGN PATENT DOCUMENTS

JP    2004-164506 A    6/2004

OTHER PUBLICATIONS

Utsav B. Gewali et al., Gaussian Processes for Vegetation Parameter Estimation from Hyperspectral Data with Limited Ground Truth, Jul. 8, 2019, [Retrieved on Jan. 17, 2023]. Retrieved from the internet: <URL: https://www.mdpi.com/2072-4292/11/13/1614> 23 Pages (1-23) (Year: 2019).*

(Continued)

*Primary Examiner* — Anibal Rivera
(74) *Attorney, Agent, or Firm* — Oblon, McClelland, Maier & Neustadt, L.L.P.

(57) ABSTRACT

An apparatus includes processing circuitry configured to: obtain first trained parameters for a model, wherein the first trained parameters have been generated by training the model using data from a first data cohort; obtain second trained parameters for the model, wherein the second trained parameters have been generated by training the model using data from a second, different data cohort; determine a first evaluation value by inputting data from the first data cohort into a model having the first trained parameters; and determine a second evaluation value by inputting data from the first data cohort into a model having the second trained parameters.

19 Claims, 21 Drawing Sheets

(56) References Cited

U.S. PATENT DOCUMENTS

2020/0401948 A1* 12/2020 Ma .................. G06N 3/082
2022/0067943 A1* 3/2022 Claessen ............. G06V 10/454

OTHER PUBLICATIONS

Abhijit Guha Roy, et al., "BrainTorrent: A Peer-to-Peer Environment for Decentralized Federated Learning," arXiv:1905.06731, May 16, 2019, pp. 1-9.

OpenMined, https://www.openmined.org/, Aug. 19, 2019, 10 pages.

Stephen Hardy, et al., "Private federated learning on vertically partitioned data via entity resolution and additively homomorphic encryption," arXiv:1711.10677, Nov. 29, 2017, pp. 1-60.

H. Brendan McMahan, et al., "Communication-Efficient Learning of Deep Networks from Decentralized Data," Proceedings of the 20th International Conference on Artificial Intelligence and Statistics (AIStats) Feb. 28, 2017. JMLR: W&CP vol. 54, 11 pages.

Jakub Konečný et al., "Federated Optimization: Distributed Machine Learning for On-Device Intelligence," arXiv:1610.02527,Oct. 8, 2016, pp. 1-38.

Jeffrey Dean, et al., "Large Scale Distributed Deep Networks," Part of: Advances in Neural Information Processing Systems 25 (NIPS 2012), pp. 1-11.

Timo M. Deist, et al., "Infrastructure and distributed learning methodology for privacy-preserving multi-centric rapid learning health care: euroCAT," Clinical and Translational Radiation Oncology vol. 4, Jun. 2017, pp. 24-31.

Arthur Jochems, et al., "Distributed learning: Developing a predictive model based on data from multiple hospitals without data leaving the hospital—A real life proof of concept," Radiotherapy and Oncology 121 , 2016, pp. 459-467.

Micah J Sheller, et al., "Multi-Institutional Deep Learning Modeling Without Sharing Patient Data: A Feasibility Study on Brain Tumor Segmentation," MICCAI, Brain Lesion (BrainLes) workshop, Sep. 16, 2018, Granada, Spain, 13 pages.

Sergey Feldman et al., "Revisiting Stein's Paradox: Multi-Task Averaging," Journal of Machine Larning Research 15 (2014) pp. 3621-3662.

* cited by examiner

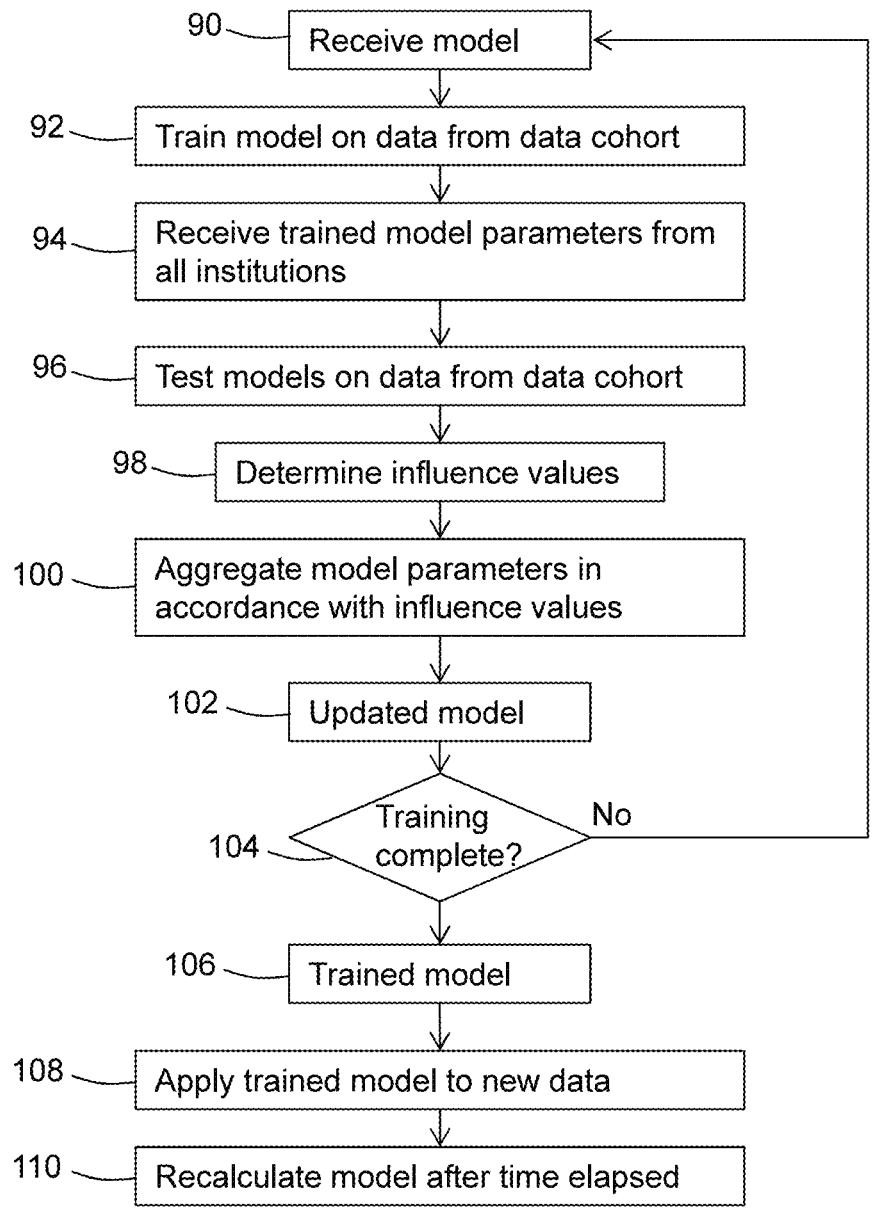
Fig. 7
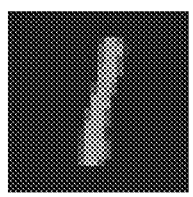 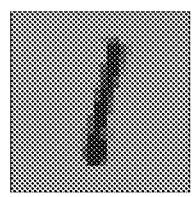
Fig. 8A  Fig. 8B

MODEL TRAINING METHOD AND APPARATUS

FIELD

Embodiments described herein relate generally to a method and apparatus for training a model, for example a method and apparatus for training a model at a plurality of institutions.

BACKGROUND

In the field of artificial intelligence (AI), it is known to train an AI model (for example, a neural network) using data from more than one institution. For example, an AI model may be trained on medical imaging data that has been acquired at, and is stored by, a plurality of hospitals or other medical institutions.

Training an AI model on data from more than one institution may be performed using an algorithm which we will refer to as a conventional federated learning algorithm.

In the conventional federated learning algorithm, an AI model (for example, a neural network) is trained on more than one cohort simultaneously without data transferring between the cohorts. The collection of institutions providing data is called a federation.

A copy of the AI model is sent from a central location server to each institution in the federation. The central location server may be any server that is not participating in the training. The central location server serves as a central connection point.

The copy of the model that has been sent to each institution is trained on the data cohort at that institution for some period of time. After the period of time, each institution returns trained model parameters to the central location server.

The central location server aggregates the trained model parameters from the plurality of institutions to form the new model. The cycle of training then repeats from the step at which the model is sent out to each institution.

FIG. 1 is a schematic diagram of a plurality of institutions 10A to 10F each holding a respective cohort of data 12A to 12F. A central location server 14 communicates with each of the institutions 10A to 10F.

In some of the description below, we refer to actions (for example, training of a model) as being performed by an institution. References to actions as being performed by an institution may be taken to relate to actions performed by one or more apparatuses having access to data held by that institution. For example, the apparatus or apparatuses may be computers located at that institution or having access to data held by that institution.

References to data being held by an institution may refer to data that is stored at, or on behalf of, that institution. Data held by an institution may be data whose use is restricted to that institution and/or data to which the institution controls access.

FIG. 2 is a schematic illustration of a conventional federated learning algorithm.

A central portion of FIG. 2 illustrates the central server 14, an institution 10, and a cohort of data 12 held by the institution 10. Arrows 16, 18 represent a cycle of training an AI model using the cohort of data 12. Arrow 16 represents the AI model being sent from the central server 14 to the institution 10. The AI model is trained at the institution 10. Arrow 18 represents the return of trained model parameters to the central server 14.

The left side of FIG. 2 is representative of a process performed at the central server 14. Although only one institution 10 is illustrated in FIG. 2, in practice the AI model is trained at each of multiple institutions 10 to obtain respective trained model parameters 20 from each institution 10. FIG. 2 shows three sets of trained model parameters 20A, 20B, 20C. The trained model parameters 20A, 20B, 20C are sent to the central server 14.

The central server 14 obtains a weighted average 22 of the trained model parameters 20A, 20B, 20C. In the conventional federated learning algorithm, the trained model parameters 20A, 20B, 20C are weighted by data cohort size. Trained model parameters obtained by training on a small data cohort are given a smaller weight in the weighted average 22 than trained model parameters that are obtained by training on a larger data cohort.

The weighted average 22 of the trained model parameters from one training cycle is used to produce a new model which may then be sent to the institutions 10 for further training. Typically, multiple cycles of model training are performed. In each cycle, a model is sent to each of the institutions 10 for training, and each institution 10 returns a respective set of trained model parameters 20.

The right side of FIG. 2 is representative of processes performed at each institution 10. The institution 10 receives a model 30 from the central server 14. The model 30 received from the central server 14 may be trained and/or applied to patient data.

A first branch of FIG. 2 shows a training process in which the model 30 is trained on data local to the institution 10. The training process outputs a set of feedback parameters 20, which may also be described as trained parameters or model parameters. The feedback parameters 20 are provided to the central server 14 to be combined with parameters from other institutions 10.

A second branch of FIG. 2 shows a process 32 in which the model 30 is used to evaluate local data to obtain a diagnosis. For example, a model 30 which has been trained using data from multiple institutions 10 may then be used at one institution 10 to analyse patient data.

A conventional federated learning algorithm may be expressed in pseudocode as follows:

---

START
//Randomly initialise and then pre-train the global model
$M_g^{t=0} \leftarrow \text{rand\_init}(M_g)$
$M_g^{t=1} \leftarrow \text{SGD}(M_g^{t=0}, L(M_g^{t=0}, d_g^{train}))$
//For each cycle of federated learning
while performing_federated_learning
  //For each institution
  for i in i = 1 to i = $N_I$
    //Copy the global model to local institution
    $M_i^t = M_g^t$
    //Train locally
    $M_i^{t+1} \leftarrow \text{SGD}(M_i^t, L(M_i^t, d_i^{train}))$
  //Parameter feedback and weighted average
  //The parameters of each local institution's model are weighted based
  //on the fraction of the total training data samples they saw during
  training $$M_g^t(b_g, w_g) = \sum_{i=1}^{i=N_I} ((b_i, w_i) * \frac{N_{d,i}^{train}}{N_D^{train}})$$

---

In the above pseudocode, M is the model, with g representing a global model (for example, a model provided by the central server 14 to all of the institutions) and i from i=1 to i=$N_1$ representing the institutions. $d_g^{train}$ is global training data held by the central server 14. $d_i^{train}$ is training data held at institution i. The model is trained using stochastic gradient descent (SGD). $N_{d,i}^{train}$ is the number of data samples used at institution i and $N_D^{train}$ is a total number of training samples across all institutions.

$b_g$ are biases of the global model. $w_g$ are weights of the global model. Together, the biases and weights make up a set of model parameters. Similarly, $b_i$ are the biases of the model at institution i and $w_i$ are the weights of the model at institution i.

This pseudocode highlights one means of training (SGD). In other federated learning methods, different model training processes may be used.

Federated learning may be of importance in tasks where large amounts of data cannot be easily transferred to a single location. This may include the medical domain. In the medical domain, datasets are typically sensitive. It may be challenging to move datasets out of the hospital or institution that generated them due to legal, political, technical, and/or financial reasons.

Federated learning seeks to train a model without any data transfer. It has been shown that conventional federated learning can successfully train a model.

Conventional federated learning operates on the assumption that all datasets within the federation are sampled from the same distribution. This is rarely the case. There are often systematic differences between institutions, for example due to differences in scanner model, protocols or interpretation.

We refer to an institution with a data cohort that is significantly different to the majority of data cohorts in other institutions in the federation as an outlying institution or an outlier.

An outlying institution may cause two issues in conventional federated learning. Firstly, the model may perform poorly at the outlying institution as the model parameters learned from the other institutions are not entirely useful to the outlying institution. Secondly, during the combining phase, the parameters returned from the outlying institution may pollute the new model with parameters learned at the outlying institution. Parameters learned at the outlying institution may be of limited usefulness to the other institutions. The inclusion of parameters learned at the outlying institution may slow down learning across the entire federation.

BRIEF DESCRIPTION OF THE DRAWINGS

Embodiments are now described, by way of non-limiting example, and are illustrated in the following figures, in which:

FIG. 7 is a flow chart illustrating in overview a method in accordance with an embodiment;

FIG. 8A shows a normal MNIST digit;

FIG. 8B shows an intensity inverted MNIST digit;

DETAILED DESCRIPTION

Certain embodiments provide an apparatus comprising processing circuitry configured to: obtain first trained parameters for a model, wherein the first trained parameters have been generated by training the model using data from a first data cohort; obtain second trained parameters for the model, wherein the second trained parameters have been generated by training the model using data from a second, different data cohort; determine a first evaluation value by inputting data from the first data cohort into a model having the first trained parameters; and determine a second evaluation value by inputting data from the first data cohort into a model having the second trained parameters.

Certain embodiments provide a method comprising: obtaining first trained parameters for a model, wherein the first trained parameters have been generated by training the model using data from a first data cohort; obtaining second trained parameters for the model, wherein the second trained parameters have been generated by training the model using data from a second, different data cohort; determining a first evaluation value by inputting data from the first data cohort into a model having the first trained parameters; and determining a second evaluation value by inputting data from the first data cohort into a model having the second trained parameters.

Certain embodiments provide a system comprising: a plurality of apparatuses, each associated with a respective entity and each having access to a respective cohort of data held by said entity; and a communications network connecting the plurality of training apparatuses; wherein the training apparatus for each entity comprises processing circuitry configured to: train a model on data from the cohort of data at said entity, thereby to obtain a set of trained parameters; receive further trained parameters from the other training apparatuses, wherein the further trained parameters have been obtained by training the model on data from the respective cohort of data held by each other entity; and determine a respective evaluation value for each set of trained parameters by inputting data from the data cohort into a model having said set of trained parameters.

Certain embodiments provide a method for training a model comprising: training a model by a respective apparatus at each of a plurality of entities, wherein the training at each of the plurality of entities is performed on a respective data cohort held at said entity, and wherein the training is to obtain respective set of trained parameters from each of the entities; transmitting, by a respective apparatus at each entity, the set of trained parameters for said entity to each other one of the plurality of entities; and determining, by a respective apparatus at each entity, a respective evaluation value for each set of trained parameters by inputting data from the data cohort at that entity into a model having said set of trained parameters.

Figure 1:
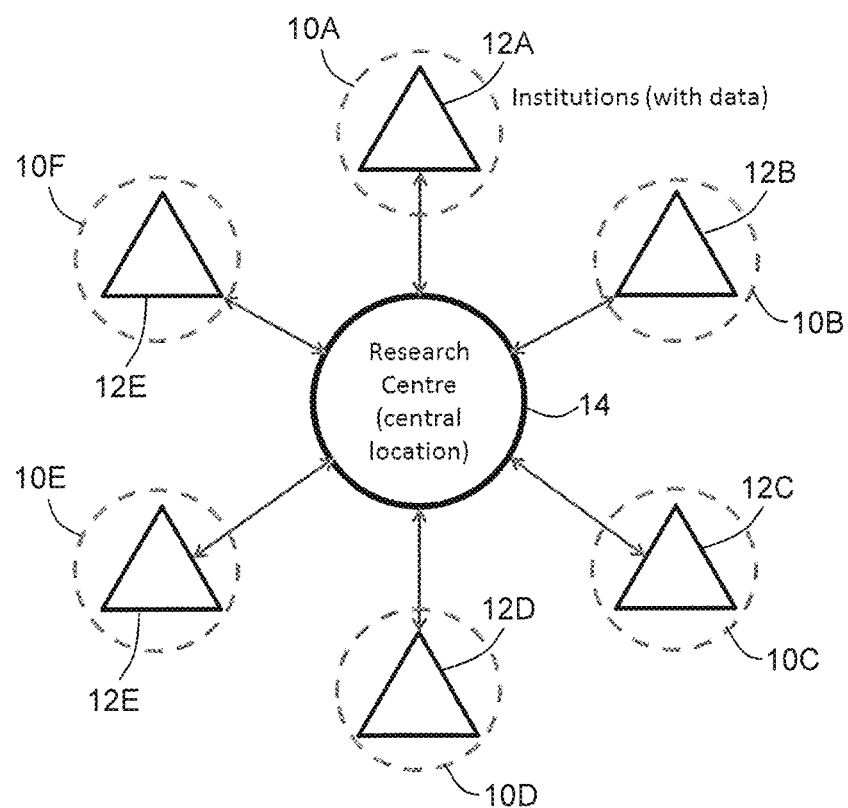
FIG. 1 is a schematic diagram showing a plurality of institutions, each connected to a central server.
Figure 2:
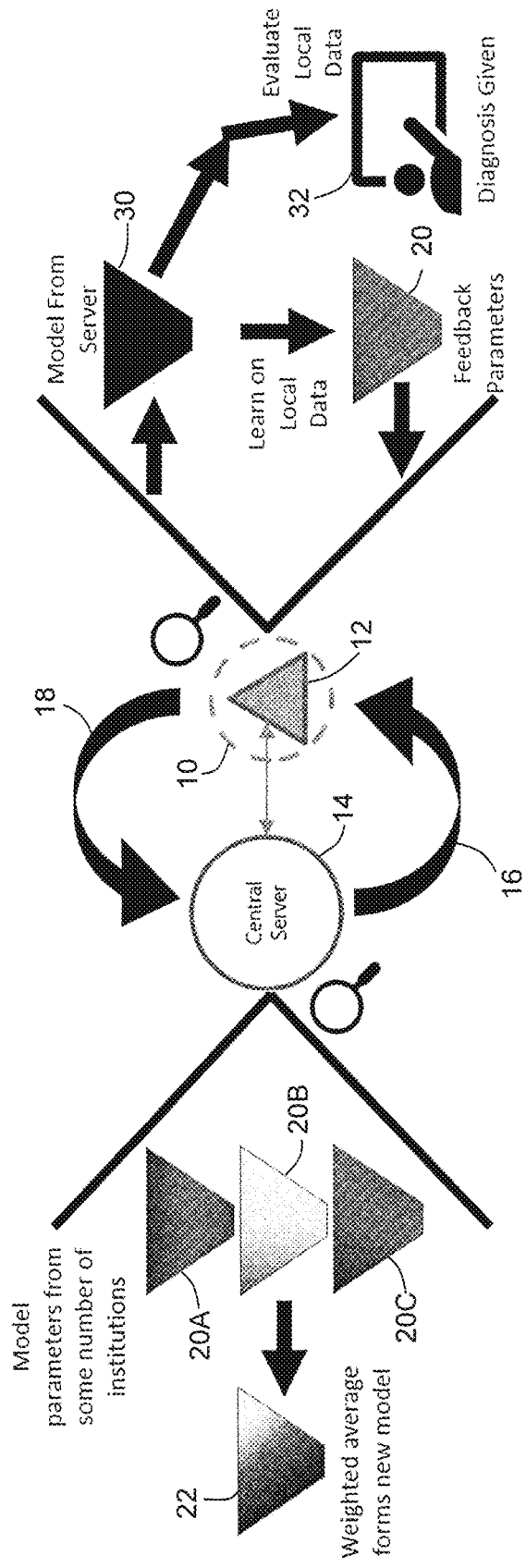
FIG. 2 is a schematic diagram representing the training of a model by conventional federated learning.
Figure 3:
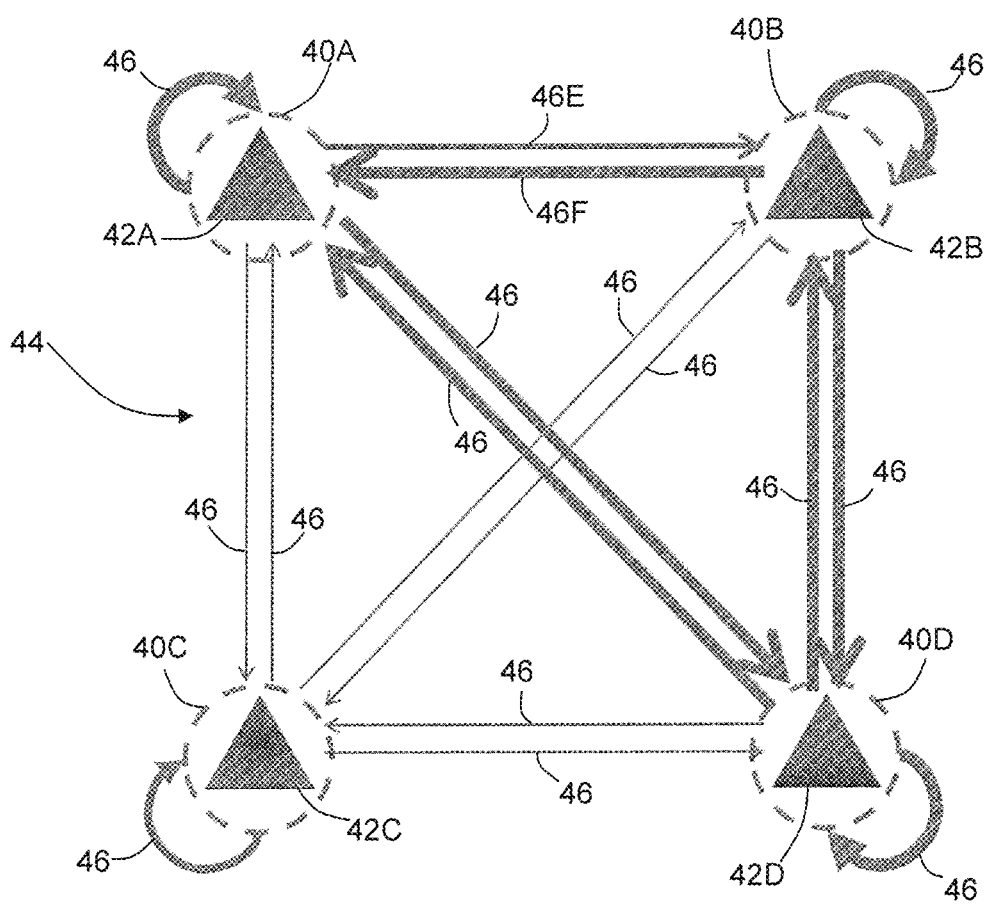
FIG. 3 is a schematic diagram of a system according to an embodiment.

FIG. 3 is a schematic illustration of a system comprising a plurality of institutions 40A, 40B, 40C, 40D. Each institution 40A, 40B, 40C, 40D has a respective data cohort 42A, 42B, 42C, 42D. Apparatuses at each of the institutions 40A, 40B, 40C, 40D are connected to each other via a communications network 44. The communications network may comprise any suitable type or types of connections, for example any suitable wired or wireless connections. For example, the communications network may form part of the internet.

FIG. 3 shows an example of four institutions. In other embodiments, any number of institutions may be connected. The institutions may form a federation for performing a federated learning method in accordance with an embodiment. In the present embodiment, the institutions are hospitals. In other embodiments, at least some of the institutions may comprise, for example, companies or universities.

In further embodiments, one or more of the institutions 40A, 40B, 40C, 40D may be replaced by any entity that is configured to store or use a data cohort. For example, in some circumstances, each entity may comprise a separate department, system or apparatus within a single institution. The entities may be such that the data cohort held by each entity is separate from the data cohorts held by other entities.

Figure 4:
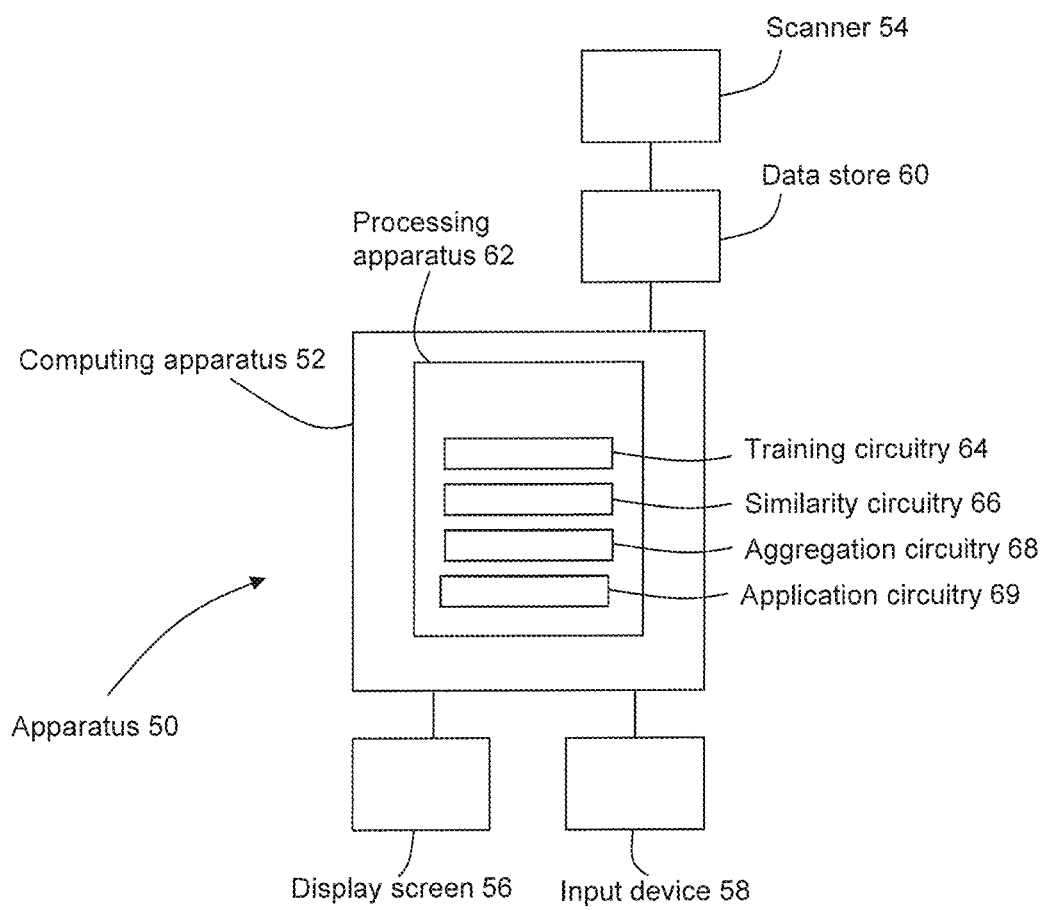
FIG. 4 is a schematic diagram of an apparatus according to an embodiment.

An apparatus 50 according to an embodiment is illustrated schematically in FIG. 4. In the present embodiment, a respective apparatus 50 is used by each of the institutions 40A, 40B, 40C, 40D. The apparatus 50 is configured to train a model (for example, a neural network) and to combine trained model parameters obtained from training on the apparatus 50 itself and from training on other apparatuses 50 at other institutions.

In the present embodiment, the apparatus is also configured to apply the trained model, for example to assist in diagnosis. In other embodiments, a different apparatus may be used to apply the trained model. In further embodiments, any apparatus or combinations of apparatuses may be used at each of the institutions.

The apparatus 50 comprises a computing apparatus 52, in this case a personal computer (PC) or workstation. The apparatus 50 is connected to at least one scanner 54 via a data store 60. The apparatus 50 is also connected to one or more display screens 56 and an input device or devices 58, such as a computer keyboard, mouse or trackball.

The at least one scanner 54 may comprise any scanner that is configured to perform medical imaging. The or each scanner 54 is configured to generate medical image data, which may comprise two-, three- or four-dimensional data in any imaging modality. For example, the scanner 54 may comprise a magnetic resonance (MR or MRI) scanner, CT (computed tomography) scanner, cone-beam CT scanner, X-ray scanner, ultrasound scanner, PET (positron emission tomography) scanner or SPECT (single photon emission computed tomography) scanner.

Image data sets obtained by the at least one scanner 54 are stored in the data store 60 and subsequently provided to computing apparatus 52.

In the present embodiment, the data store 60 stores a cohort of training data comprising a plurality of training image data sets. Each of the training image data sets has an associated set of ground truth data. For example, the ground truth data may comprise classification and/or segmentation data. The ground truth data may have been obtained by manual annotation of the training image data set, or by any suitable automated or semi-automated method.

In an alternative embodiment, training image data sets and/or other image data sets are supplied from one or more further data stores (not shown) which may form part of a Picture Archiving and Communication System (PACS). The data store 60 or further data store may comprise any suitable form of memory storage.

In general, access to the training image data sets and other image data sets stored in the data store 60 is restricted to a single institution. The apparatus 50 only has access to data from its own institution. For example, an apparatus 50 that has access to data from institution 40A does not have access to data from institutions 40B, 40C, 40D. Further data access restrictions may also be in place. For example, access to the training image data sets and/or other image data sets of a given institution may be restricted to a single apparatus 50 or group of apparatuses, which may be located within that institution. Access may be restricted to particular users. In some circumstances, the apparatus 50 or group of apparatuses may not have access to other data (for example, medical records) that is associated with the training image data sets and/or other image data sets.

Computing apparatus 52 comprises a processing apparatus 62 for processing of data, including image data. The processing apparatus comprises a central processing unit (CPU) and Graphical Processing Unit (GPU). In other embodiments, the processing apparatus may comprise a CPU without a GPU.

The processing apparatus 62 includes training circuitry 64 configured to train a model on data from the data cohort of training image data sets stored in the data store 60; similarity circuitry 66 configured to determine a measure that is representative of a similarity between institutions and/or data cohorts; aggregation circuitry 68 configured to combine model parameter values to obtain an updated model; and application circuitry 69 configured to apply a trained model to new data.

In the present embodiment, the circuitries 64, 66, 68, 69 are each implemented in the CPU and/or GPU by means of a computer program having computer-readable instructions that are executable to perform the method of the embodiment. In other embodiments, the various circuitries may be implemented as one or more ASICs (application specific integrated circuits) or FPGAs (field programmable gate arrays).

The computing apparatus 52 also includes a hard drive and other components of a PC including RAM, ROM, a data bus, an operating system including various device drivers, and hardware devices including a graphics card. Such components are not shown in FIG. 4 for clarity.

In the embodiment of FIG. 4, the data store 60 stores a data cohort comprising medical imaging data obtained from the scanner 54. In other embodiments, the data in the data cohort may comprise any type of imaging data, which may not be medical imaging data. In further embodiments, any type of data may be stored by the data store 60. The data may not be imaging data. The data may not be medical data. The data may have any suitable number of dimensions.

Turning again to FIG. 3, each institution 40A, 40B, 40C, 40D has a respective one or more apparatuses 50 as described above with reference to FIG. 4. Each of the apparatuses has access to a respective data cohort at its respective institution. The data cohort for an institution may comprise data acquired by scanners located at the institution.

The data cohort for an institution may comprise data for patients treated by the institution.

Typically, the apparatus at an institution only has access to the data cohort for that institution. The apparatus does not have access to data cohorts held at other institutions. For example, data transfer between institution may be restricted for reasons of data protection and/or medical privacy. In some cases, data cohorts may be very large. For example, medical imaging scans may generate very large data files. It may therefore be difficult or impossible to share or transfer data cohorts between institutions. An apparatus at an institution may not be capable of receiving a data cohort from another institution.

In the present embodiment, each apparatus is located at its respective institution. In other embodiments, an apparatus may be located remotely from its respective institution, but may have access to the data cohort for that institution.

The apparatuses 50 at institutions 40A, 40B, 40C, 40D are configured to communicate with each other via the communications network 44. In other embodiments, any suitable number or type of communications networks may be used to connect the apparatuses at institutions 40A, 40B, 40C, 40D. Unlike in conventional federated learning, no central server is used to communicate with all the apparatuses 50. Instead, the apparatuses 50 may communicate directly with each other over the communications network 44.

The system of FIG. 4 is configured to perform a method which may be referred to as soft federated learning. Soft federated learning is described below with reference to FIGS. 5 to 15.

Figure 5:
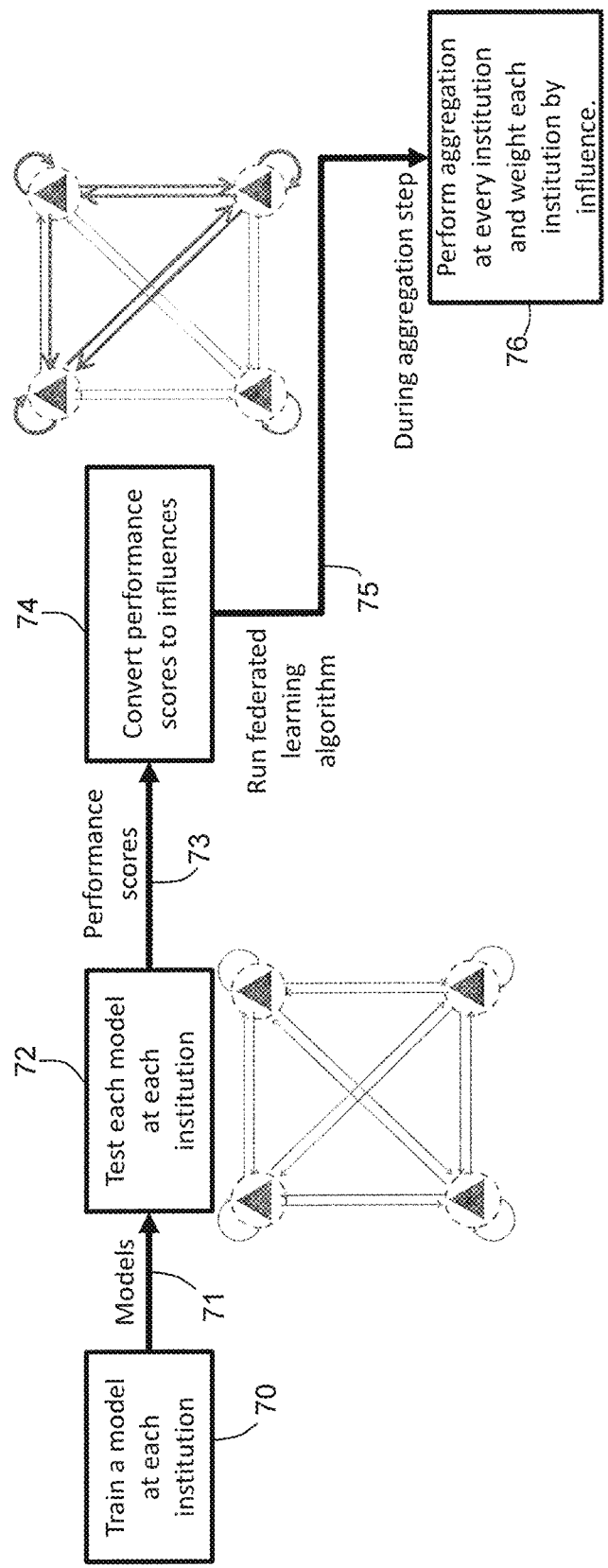
FIG. 5 is a flow chart illustrating in overview a training method in accordance with an embodiment.

FIG. 5 is a flow chart illustrating in overview a training method in accordance with an embodiment. The training method is performed by apparatuses 50 at a plurality of institutions 40A, 40B, 40C, 40D, the apparatuses being connected in a network 44 as described above with reference to FIG. 3.

Suppose we have multiple data cohorts 42A, 42B, 42C, 42D, for example as illustrated in FIG. 3. We wish to compare the similarity of these cohorts 42A, 42B, 42C, 42D to each other without transferring data. The similarity then provides an influence that each institution should receive from each other institution during model aggregation. A method of calculating and aggregating such influences is described below.

Similarity is calculated by training a model at each institution 40A, 40B, 40C, 40D, and testing these models at all institutions 40A, 40B, 40C, 40D (including the one it was trained at). The performance of the models above random chance accuracy gives a performance score. After the performance scores are calculated, they are normalised on a per institution basis to provide the influence values. The influence values may be re-calculated at intervals to ensure that they are up-to-date as institutions change over time.

Before the start of the process represented by the flow chart of FIG. 5, a model is provided to each institution 40A, 40B, 40C, 40D. The model provided may be referred to as a global model. The same model is provided to each institution 40A, 40B, 40C, 40D. The model may be stored or generated at a first one of the institutions (for example, 40A) and provided by the first one of the institutions 40A to the other institutions 40B, 40C, 40D. In some embodiments, the model is generated at an external institution that is not part of the federation. The model may be pre-trained at the external institution on a data cohort that is similar to the data cohorts of at least some of the institutions 40A, 40B, 40C, 40D in the federation.

The model may comprise any suitable deep learning or artificial intelligence model. The model may comprise a neural network, for example a convolutional neural network.

The model is described by a set of model parameters. In the present embodiment, the set of model parameters comprises a set of biases and a set of weights. In the description below, references to a model may be interchangeable with references to a set of model parameters. For example, a reference to a model being transferred between institutions may be taken to refer to a set of model parameters being transferred between institutions.

It may be intended to train the model to perform any suitable task or tasks, for example a task or tasks to be used in clinical practice. For example, the model may be intended to perform any suitable classification or regression. In the context of medical imaging, the model may be configured to perform, for example, a classification and/or segmentation. The model may be configured to obtain a location and/or a bounding box.

At stage 70 of FIG. 5, the model is trained at each of the institutions 40A, 40B, 40C, 40D.

We consider the case of institution 40A. A training apparatus 50A at institution 40A receives data from a data cohort 42A held by institution 40A. The data may comprise a subset of the data held in the data cohort 42A. In the present embodiment, the data cohort 42A comprises scanner data and ground truth data (for example, ground truth classifications and/or ground truth segmentations).

The training circuitry 64A of the training apparatus 50A provides the data to the model and performs a model training process with the aim of training the model to produce a desired output. Any suitable model training process may be used. For example, stochastic gradient descent may be used. In other embodiments, Adadelta, Adam, or Nadam training methods may be used.

An output of the model training process is a set of trained parameters 20A for the model.

At stage 71, the training apparatus 50A stores a copy of the trained parameters 20A that it has obtained by training the model on the data received from its own institution's data cohort. The training apparatus 50A also sends a copy of the trained parameters 20A that it has obtained by training the model on its own institution's data cohort to apparatuses at each of the other institutions 40B, 40C, 40D.

Corresponding training processes for the model are performed by apparatuses 50B, 50C, 50D at each of the other institutions 40B, 40C, 40D. Each training process results in a respective set of trained model parameters 20B, 20C, 20D.

The training apparatus 50A at the first institution 40A receives from the apparatuses at each of the other institutions 40B, 40C, 40D a copy of the trained parameters 20B, 20C, 20D that have been obtained by training the model at that institution. Similarly, the training apparatuses 50B, 50C, 50D at the other institutions also receive the trained parameters that were obtained at each of the institutions.

It may be expected that training the model on different data cohorts 42A, 42B, 42C, 42D is likely to result in different trained parameters 20A, 20B, 20C, 20D being obtained. Different data cohorts may have different numbers of data samples, for example data from different numbers of scans. The data held in different data cohorts may differ in, for example, the scanner type and/or scanner settings and/or scanner protocols used.

Two institutions may be considered similar if a model trained at one of the institutions provides good results at the other institution.

At stage 72, the similarity circuitry 66A performs a similarity determining procedure to find a similarity between the model trained at the first institution 40A and the model trained at each of the institutions 40A, 40B, 40C, 40D. This includes pairing the first institution with itself.

The apparatuses 50B, 50C, 50D at the other institutions perform similar similarity determining procedures to find the similarity between every pair of institutions, including pairing with self.

The case of comparing a first institution to a second, different institution may be considered to be a usual case. We consider similarity circuitry 66A of the training apparatus 50A at the first institution 40A. The similarity circuitry 66A receives trained parameters 20B from the second institution 40B. The trained parameters 20B received from the second institution 20B were obtained by training the model using data from a data cohort 42B held by the second institution 40B.

The similarity circuitry 66A generates a model using the trained parameters 20B from the second institution 40B. The similarity circuitry 66A tests the model using data from the data cohort 42A held by the first institution 40A. The data used for testing may be a subset of the data cohort 40A.

The similarity circuitry 66A determines a performance score. The performance score is representative of a degree of accuracy with which the model performs. The degree of accuracy is determined by comparing an output of the model to ground truth. For example, a fraction of correct predictions by the model on a given task may be evaluated against the ground truth.

The performance score is an absolute measure of accuracy. The performance score is an absolute measure of how correct the model is.

Similarly, the similarity circuitry 66B of the apparatus 50B at institution 40B tests model parameters 20A from a model trained on data cohort 42A at institution 40A.

In the present embodiment, training and testing are performed using three-fold cross-validation. In other embodiments, any number of folds may be used. The results of the folds are averaged to give a final performance score.

The training circuitry 64A of the first institution trains on all but one fold of its data cohort 42A. The similarity circuitry 66B of the second institution receives trained parameters 20A from the first institution and tests them on one of the folds of its data cohort 42B. This is repeated until all folds of data cohort 42B have been used for testing.

The training circuitry 64B of the second institution trains on all but one fold of its data cohort 42B. The similarity circuitry 66A of the first institution receives trained parameters 20B from the second institution and tests them on one of the folds of its data cohort 42A. This is repeated until all folds of data cohort 42A have been used for testing.

For each fold, the accuracy in testing gives the performance score. The performance score is averaged over all three folds to give the final performance score.

We turn to the case where a model trained at one institution is being compared with itself. For example, a similarity procedure is applied to a model trained by apparatus 50A at institution 40A, using test data from cohort 40B at institution 40A. The case of comparing an institution 40A with itself may be considered to be a special case.

The training data cohort 42A at the institution 40A is divided into a number of folds. The number of folds is at least two. In the present embodiment, the training data cohort is divided into three folds.

The training circuitry 64A and similarity circuitry 66A train and test on the data 42A using n-fold (in the present embodiment, three-fold) cross-validation. The training circuitry 64A trains on all but one fold. The similarity circuitry 66A receives trained parameters 20A from the training circuitry 64A and tests on the left out fold. This is repeated until all folds have been used for testing.

For each fold, the accuracy in testing gives the performance score. The performance score is averaged over all folds to give the final performance score.

Figure 6:
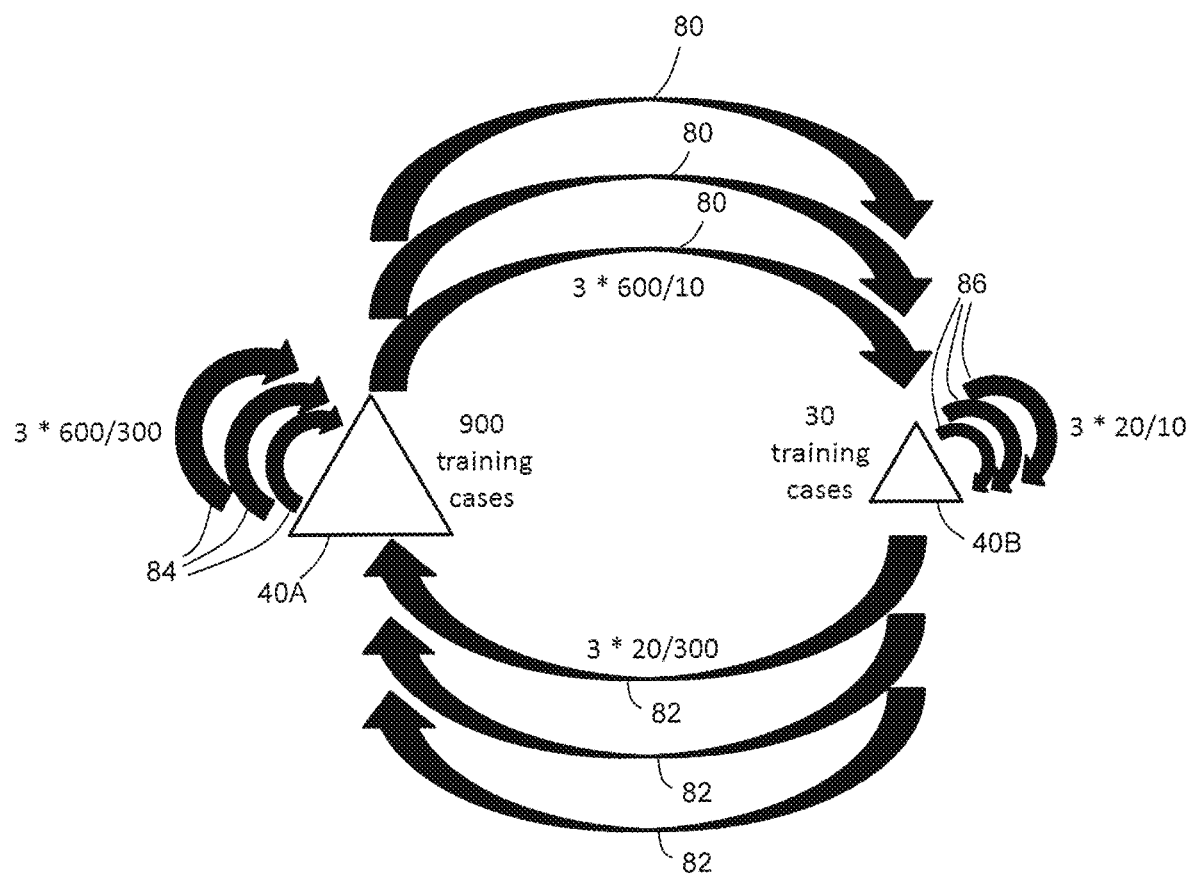
FIG. 6 is a schematic illustration of a three-fold cross-validation process.

FIG. 6 is a schematic illustration of an example of training and testing at institutions 40A and 40B using three-fold cross-validation. Similar training and testing may be performed by each pair of institutions.

Institutions 40A and 40B are represented by triangles. In the example shown, institution 40A has a data cohort 42A comprising 900 training cases. Institution 40B has a data cohort 42B comprising 30 training cases. Each arrow represents one training/evaluation run for Soft Federated Learning.

Three-fold evaluation divides each data cohort into three equal subdivisions (more generally: n-fold would divide into n subdivisions). The models are then trained on two (n-1) of these subdivisions and tested on one (the one not used for training in the case of evaluating at the same institution). Each fold uses a different two training subdivisions and evaluation subdivision.

Three arrows 80 represent three instances of training of the model at the first institution 40A and testing at the second institution 40B. In each instance, the model is trained on two of the folds of data cohort 42A, so the model is trained on 600 samples. The model is tested on one fold of data cohort 42B, so the model is tested on 10 evaluation samples.

A further three arrows 82 represent three instances of training of the model at the second institution 40B and testing at the first institution 40A. In each instance, the model is trained on two of the folds of data cohort 42B, so the model is trained on 20 samples. The model is tested on one fold of data cohort 42A, so the model is tested on 300 evaluation samples.

Three arrows 84 represent three instances of training the model at the first institution 40A and testing at the same institution 40A. In each instance, the model is trained on two of the folds of data cohort 42A, so the model is trained on 600 samples. The model is tested on one fold of data cohort 42A, so the model is tested on 300 evaluation samples.

Three arrows 86 represent three instances of training of the model at the second institution 40B and testing at the same institution 40B. In each instance, the model is trained on two of the folds of data cohort 42B, so the model is trained on 20 samples. The model is tested on one fold of data cohort 42B, so the model is tested on 10 evaluation samples.

The process as shown in FIG. 6 is repeated for each pair of institutions.

Every one of the institutions 40A, 40B, 40C, 40D determines a set of performance scores 73, where each performance score is representative of a similarity between that institution and each other one of the institutions in the network (including itself).

When all performance scores are calculated, it may be considered that there is an m by m matrix of performance scores, where m is the number of institutions. This is because every pair of institutions has a score. Note that in general this matrix will not be symmetric. A performance score of a model trained at a first institution and applied to a data cohort at a second institution may be different from the performance score of a model trained at the first institution and applied to a data cohort at the first institution.

We note that in practice, it may be the case that no one institution holds the entire matrix of performance scores. Each institution may only hold the performance scores relating to that institution.

At stage 74, the performance scores are used to generate a set of influence values, which may also be referred to as evaluation values.

We consider one apparatus 50A at one institution 40A. The similarity circuitry 66A has stored a respective performance score for each of the institutions 40A, 40B, 40C, 40D. The similarity circuitry 66A converts each performance score into an accuracy above random chance. The performance score is an absolute measure of performance. The accuracy above random chance is a relative measure. It is relative to the performance that would be achieved by random chance.

To convert a performance score into accuracy above random chance, the similarity circuitry first determines the random chance accuracy for the task that the model is configured to perform. For example, we consider a classification task. Random chance accuracy is the highest fraction of a particular class in the dataset. In a binary classification task where there are two classes that appear with equal frequency, the random chance accuracy would be 0.5. However, if there was one class that was 90% of all classes, the random chance accuracy would be 0.9.

If the performance is below random chance, the determined accuracy above random chance is 0.

If the performance is above random chance, an accuracy above random chance is determined by:

Accuracy above random chance=$(P-R)/(1-R)$ where P is the Performance score and R is the Random chance accuracy.

The similarity circuitry 66A then normalises all of the performance scores that it holds such that each of the accuracy above random chance is between 0 and 1. The normalisation is such that, for each institution, the accuracy above random chance values for the models tested at that institution sum to 1.

The normalised accuracy above random chance values are referred to as influence values or as evaluation values.

The influence values may be considered to represent how useful a model trained at one institution is to another institution (or to its own institution). A model which is considered to be useful has a high influence value. A model which is considered not to be useful has a low influence value.

Again, it is emphasized that different institutions will hold different sets of performance scores, which will be normalised to produce different influence values. For example, a given set of trained model parameters may be more useful to a first institution than to a second institution if the first institution is more similar to the institution on which the model parameters are trained. In some circumstances, an institution may find a model trained at another institution to be more useful than a model that was trained locally at the institution. For example, the other institution may have trained the model on a larger data set.

We turn again to FIG. 3. FIG. 3 shows a set of arrows 46. Each of the arrows is representative of a respective influence value, with the thicker arrows being representative of higher influence values. It may be seen from FIG. 3 that each of the institutions has an influence value for itself. It may also be seen that the influence value from a first institution to a second institution may be different from the influence value in the opposite direction from the second institution to the first institution. For example, an arrow 46E from the first institution 40A to the second institution 40B is narrower than an arrow 46F from the second institution 40B to the first institution 40A. The influence value for a model trained on 40B when applied to 40A is higher than the influence value for a model trained on 40A when applied to 40B.

At stage 75, the aggregation circuitry 68 at each institution runs a federated learning algorithm using the influence values obtained at stage 108. The federated learning algorithm is run separately at each institution.

The federated learning algorithm includes an aggregation step 76. In the aggregation step 76, the aggregation circuitry 68 aggregates the model parameters obtained from each of the institutions. The aggregation comprises weighting the model parameters from each of the institutions in accordance with their influence values.

In the embodiment of FIG. 5, there is no explicit weighting of the model parameters by a number of training cases on which each model was trained. It may be the case that models trained on more training cases have more useful parameters, and so therefore may have higher influence values. However, in some circumstances, models trained on more training cases may not have high influence values, for example when the training institution uses a different scanner than the institution where the aggregation is being performed.

By aggregating using influence values, it may be ensured that the new model formed at each institution is specialised to work at that institution. Such specialisation may lead to a higher performance.

An output of FIG. 5 is a respective updated model for each institution. At each institution, the updated model is formed by aggregating model parameters from all of the institutions in accordance with the influence values.

FIG. 5 shows only one training cycle. In practice, multiple training cycles may be performed. For example, in an embodiment, each institution sends its updated model to all of the institutions for training. Each of the institutions returns further model parameters that were obtained by training the updated model on data held at that institution. Each institution tests received model parameters on its own data as described above with reference to stage 72, to obtain updated influence values. The updated influence values are then aggregated. The cycle may be repeated multiple times, for example until models converge.

FIG. 7 is a further flow chart illustrating the embodiment of FIG. 5 from the perspective of a single one of the apparatuses 50.

At stage 90, the training circuitry 64 of the apparatus 50 receives a model. At stage 92, the training circuitry 64 trains the model on data from a data cohort held locally to the apparatus 50, to obtain a set of model parameters. At stage 94, the similarity circuitry 66 receives the model parameters trained at the apparatus 50, and also receives sets of model parameters trained on apparatuses at other institutions. At stage 96, the similarity circuitry 66 tests all of the model parameters on data from the local data cohort. At stage 98, the similarity circuitry 66 processes the results of the testing to obtain influence values for all of the institutions. At stage 100, the aggregation circuitry 68 aggregates the model parameters using weights which are dependent on the influence values. At stage 102, the aggregation circuitry 68 outputs an updated model.

At stage 104, the training circuitry 64 determines whether training is complete. For example, the training circuitry 64 may determine a measure of convergence. If the training is not complete, the flow chart returns to stage 90. The training circuitry 64 receives the updated model to train.

If the training is complete, the training circuitry 66 outputs a trained model at stage 106. At stage 108, the application circuitry 69 applies the trained model to new data. The new data may be data that is not part of the training data on which the model was trained. The new data may comprise any suitable imaging data set or data sets.

When applied to a new data set, the trained model performs the task for which it is trained, for example classification and/or segmentation and/or location. A clinician may use the results of the trained model to obtain information about the imaging data set. The clinician may use the results of the trained model to assist in a diagnosis.

It may be expected that some aspects of institutions may change over time. Therefore, it may be beneficial to re-run the model training process of FIGS. 5 and 7 at intervals to update the model parameters and/or weights. At stage 110 of FIG. 7, the training circuitry 64 restarts the model training process. A number of training cycles may be performed, for example in accordance with stages 90 to 104 as described above. A new trained model may be produced by the model training process of stage 110.

Influence values from a given institution may change over time, for example due to a new scanner. Therefore, model training using a soft federated learning method may be performed at regular intervals, for example at intervals of 6 months or a year, in order to recalculate influence values.

In some embodiments, model training is performed whenever an institution leaves or joins the federation, or when an institution undergoes a major change (for example, a new scanner).

By using the soft federated learning model described above with reference to FIGS. 5 and 7, the trained model obtained at each institution may be more suitable for that institution than a model that is trained centrally using conventional federated learning. The resulting trained model may have better performance in the task for which it is trained. The trained model may be tailored to individual institutions. More weight may be given to models trained on other, similar institutions than models trained on dissimilar institutions.

The soft federated learning method does not assume that all data comes from the same distribution. The soft federated learning method takes account of differences between different data cohorts. Outliers may have a reduced effect on the federated learning process.

In general, medical data is sensitive so cannot easily be transferred to a central location. A federated learning algorithm allows data to be kept at the institutions. In general, data cohorts from different institutions have systematic differences, which are not accounted for in conventional federated learning. As medical data from different hospitals may typically have systematic differences, conventional federated learning may not provide a strong performance when the differences are significant.

Soft federated learning may be considered to modify a conventional federated learning algorithm to correct for differences between institutions.

A soft federated learning algorithm is deployed across multiple institutions (for example, hospitals) and is used to compare the data cohorts between the institutions. The comparison leads to an influence value between institutions. A conventional federated learning algorithm may be considered to be modified according to the influence measure. Instead of an institution receiving an equal weighting from all institutions, the weighting is now adjusted by the influence value. The soft federated learning method may remove the need for a central server during use. The soft federated learning method may protect against compromised or malfunctioning institutions. The soft federated learning method may improve performance in outlier institutions.

The soft federated learning method of FIGS. 5 and 7 differs from conventional federated learning algorithms in that every model is sent to every institution instead of to a central server. No central server is used in the method of FIGS. 5 and 7.

Benefits of removing a central server may include control and/or privacy. The institutions may no longer rely on a third party (the central server) to be functioning (and functioning correctly) for federated learning to take place. Institutions may communicate directly to each other without going through the central server. No third party receives the models, so the model data remains fully within the group of institutions, for example a hospital federation. The lack of a third party receiving the models may result in fewer privacy concerns.

Model aggregation takes place locally at an institution, which is an environment the end users may have more control over than a central server in a different, unknown location.

Costs may be incurred in computational complexity. As every model is sent to every other institution during soft federated learning, there is an $O(m^2)$ computational complexity of the algorithm, where m is the number of institutions. However, this computational cost is now divided between m institutions. Furthermore, if the influence between two institutions is zero, there is no need to transfer the model across (as it will be weighted by zero). This compares to an $O(m)$ computational cost for conventional federated learning.

Calculating the influence for every institution pair may be costly, with an $O(m)$ training cost for the models (divided between m institutions), and an $O(m^2)$ testing cost (again divided between m institutions). Conventional federated learning does not feature this step.

A prototype has been created to test the proposed method described above with reference to FIGS. 5 and 7. The prototype has been applied to exemplary test data from the MNIST (Modified National Institute of Standards and Technology) data set. The MNIST data set comprises images of handwritten numerals. The MNIST data set is often used in machine learning as a training and testing data set.

The results show that, in the experiments performed, soft federated learning performs better than conventional federated learning. The experiments and their results are described below with reference to FIGS. 8*a* to 13.

A first experiment relates to cohort size and domain differences. In the first experiment, data from the MNIST data set is used to simulate data cohorts at three institutions. The first institution (institution 1) has a data cohort consisting of 30 data samples. The second institution (institution 2) has a data cohort consisting of 3000 training samples. The third institution (institution 3) has a data cohort consisting of 3000 training samples. The training samples of the third institution have been intensity inverted to make the third institution into an outlier. FIG. 8A shows one example of a normal MNIST image. FIG. 8B shows an intensity inverted version of the MNIST image of FIG. 8A.

The data cohorts in the first experiment were structured such that the smaller institution (institution 1) should have less influence on the bigger institution (institution 2) than the other way around. The data cohorts were structured such that institution 3 should be an outlier.

A simulated training process was performed. The simulated training process comprised using the simulated data cohorts at the three institutions to train and test a model using soft federated learning as described above with reference to FIG. 5. In each of a plurality of training cycles, a model was trained by each of the institutions. Each institution then tested all of the trained models and determined a respective influence value for each of the trained models.

Figure 9A:
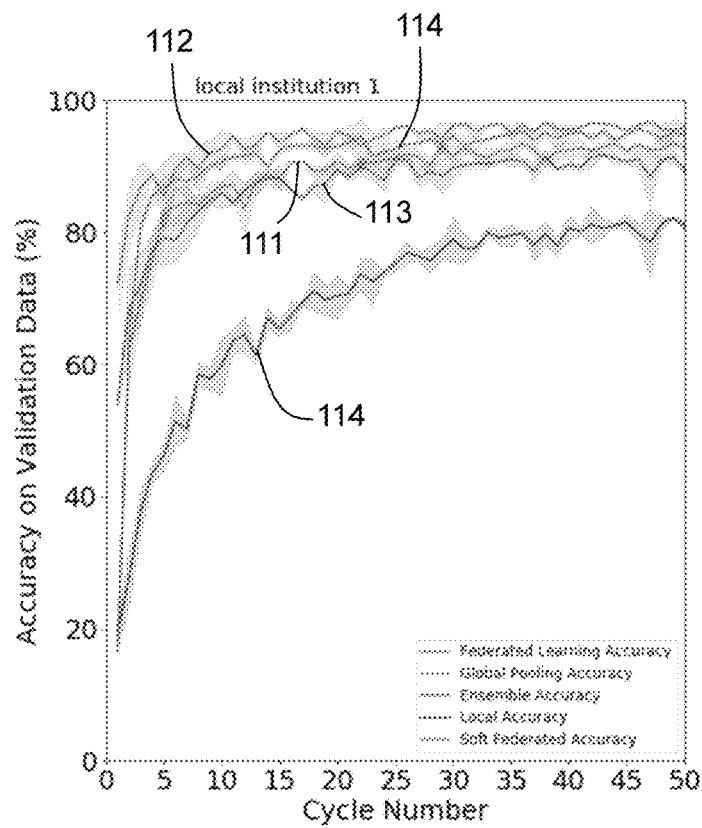
FIGS. 9A, 9B and 9C are plots of results of a first experiment in which a model is trained on MNIST data using a conventional federated learning method, and using a method in accordance with an embodiment.
Figure 9B:
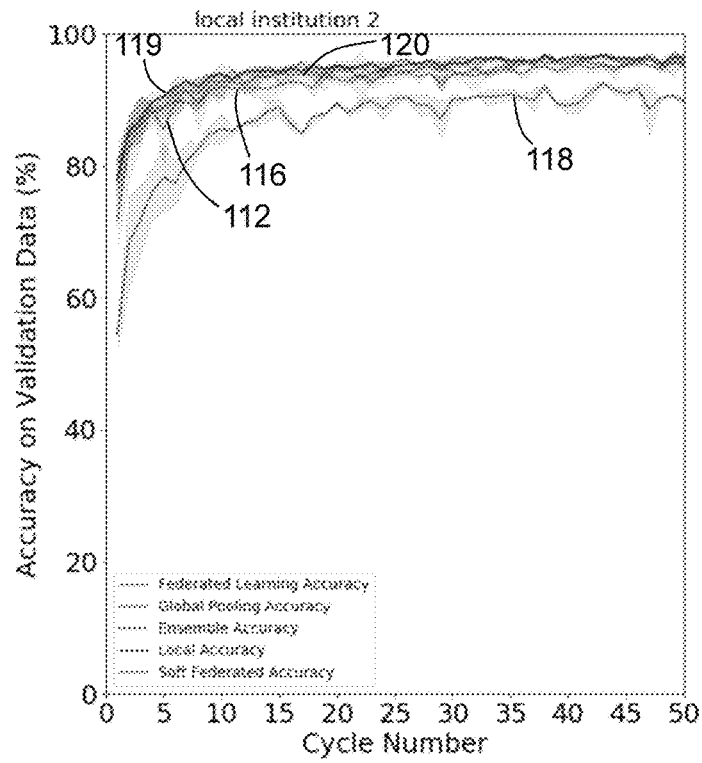
Figure 9C:
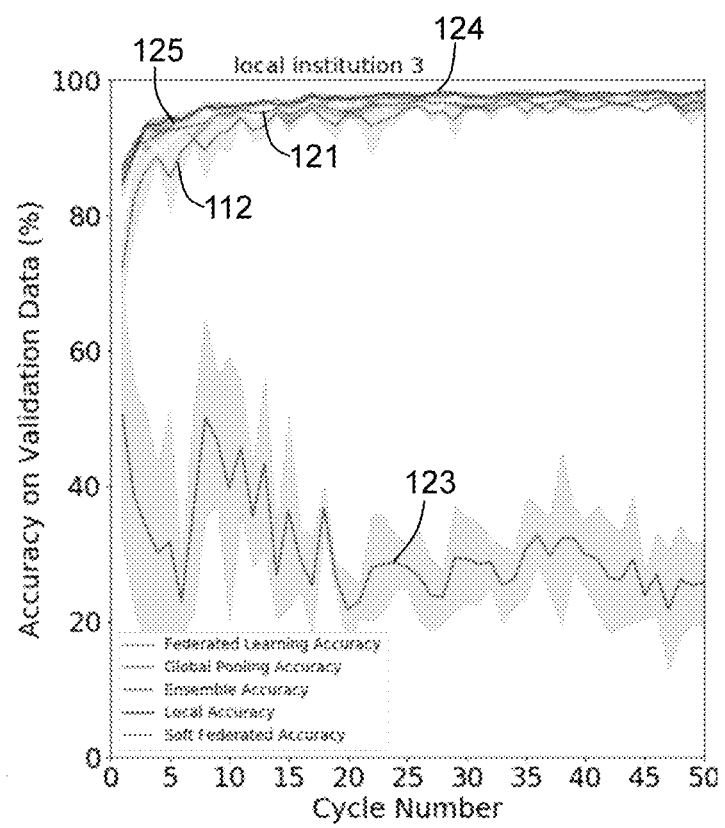

FIGS. 9A, 9B and 9C are plots showing an accuracy of validation data (as a percentage) against a number of training cycles. The institutions are labelled as institution 1, institution 2 and institution 3.

FIG. 9A relates to the first institution, institution 1. Line 111 shows a performance of conventional federated learning.

Line 112 shows a performance of a global pooling method, in which a single model is trained on all of the data. Data in all institutions are pooled into one place, and then a model is trained on this pooled data. Since the global pooling evaluation is a single evaluation, rather than one evaluation for each institution, line 112 is identical on FIGS. 9B and 9C.

Line 114 shows a local accuracy, which is a performance of a model trained within institution 1 with no model aggregation or sharing. Line 113 shows an ensemble accuracy, which is an average performance of a set of models where this set contains locally trained models for all three institutions. Line 115 shows a performance of soft federated learning as described above with reference to FIGS. 5 and 7. Shaded regions around the lines are representative of error bars.

In FIG. 9A, the local accuracy is relatively poor due to the low amount of training data at that institution. The two federated methods (soft federated learning 115 and conventional federated learning 11) perform well, showing their strength at small institutions. Soft federated learning performs better than conventional federated learning as it recognises institution 3 as an outlier.

FIG. 9B relates to the second institution, institution 2. Line 116 shows a performance of conventional federated learning. Line 112 shows a performance of global pooling.

Line 118 shows an ensemble accuracy. Line 119 shows a local accuracy for institution 2. Line 120 shows a performance of soft federated learning.

FIG. 9C relates to the third institution. Line 121 shows a performance of conventional federated learning. Line 112 shows a performance of global pooling. Line 123 shows an ensemble accuracy. Line 124 shows a local accuracy for institution 3. Line 125 shows a performance of soft federated learning.

Figure 10A:
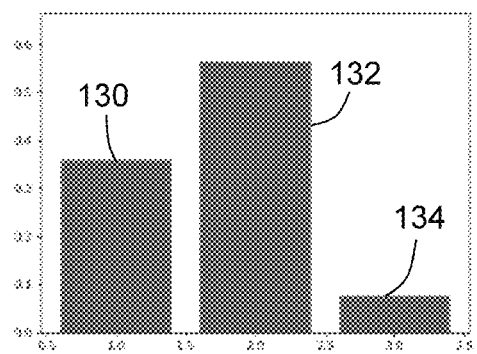
FIGS. 10A, 10B and 10C are plots of influences obtained in the first experiment using a method in accordance with an embodiment.
Figure 10B:
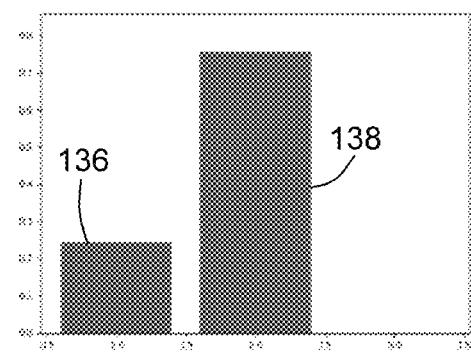
Figure 10C:
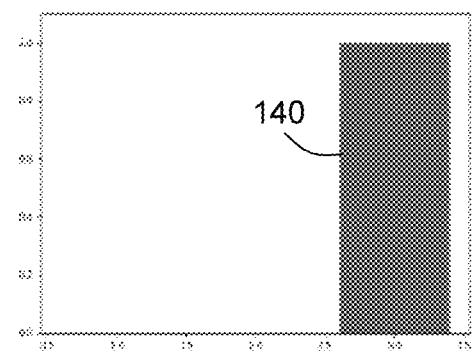

FIGS. 10A, 10B and 10C show the amount of influence each institution received from other institutions in the first experiment.

FIG. 10A shows influence values calculated by institution 1, which is the institution with 30 training samples. FIG. 10A shows that institution 1 receives a medium amount of influence from itself (bar 130), a lot of influence from institution 2 (bar 132), and a small amount of influence from institution 3 (bar 134).

It is expected that institution 1 would receive a high influence from institution 2. Institution 2 is the institution with 3000 data samples. A model trained on the 3000 data samples may be expected to be more useful than the model trained on 30 data samples, if the samples are broadly similar.

It is also expected that institution 1 would receive a low influence from institution 3. Institution 3 is an outlier because its data samples are intensity-inverted.

We turn to FIG. 10B which shows the amount of influence received by institution 2. Institution 2 receives a relatively small amount of influence from institution 1 (bar 136), which may be as expected due to the relatively small cohort size at institution 1. Institution 2 receives a high amount of influence from itself (bar 138). Institution 2 receives no influence from institution 3, the outlier.

Turning to FIG. 10C which is representative of the influence received by institution 3, it may be seen that institution 3 only receives influence from itself (bar 140). It may be expected that institution 3, which has a large cohort of intensity-inverted samples, may find its own trained model more useful than those of institutions 1 and 2, which train the model on non-intensity-inverted samples.

It may be concluded that in experiment 1, the soft federation has learned that institution 3 is an outlier and therefore it has minimal influence to institutions 1 and 2. This provides an improvement over conventional federated learning. Typically, conventional federated learning would weight the combination of model parameters using cohort size. This weighting would not take into account the difference in the type of data in the cohorts (here, intensity-inverted and non-intensity inverted). Conventional federated learning may be negatively affected by outlier institutions.

In the first experiment, institution 2 receives less influence from institution 1 than institution 1 receives from institution 2. This is due to the size differences between the institutions and ensures that relative sizes are captured during influencing. This is a strength of soft federated learning in the first experiment.

In experiment 1, the model trained on institution 1 is overfitting slightly to its own data, since it doesn't have many training examples. This leads to a reduced performance when tested at institution 2. On the other hand, institution 2's model has a lot of training data, and therefore it performs well on institution 1.

The results of FIGS. 9A to 9C show that soft federated learning beats conventional federated learning in institution 1 by a small margin. Performance is similar in institutions 2 and 3.

Figure 11:
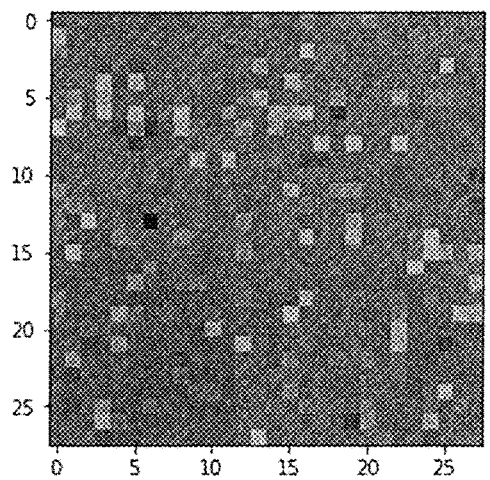
FIG. 11 shows an example of a Gaussian noise sample.

A second experiment was performed. The second experiment may be described as a noise test. In the second experiment, nine institutions were simulated. The first institution had a cohort of 30 MNIST training samples, each comprising an image of a handwritten number. The data cohorts provided to the other eight simulated institutions each comprised a respective 30 examples. The 30 examples had no signal, only Gaussian noise. That is to say, each of the 30 examples did not contain an image of a number, but instead contained only noise. FIG. 11 shows an example of a Gaussian noise sample. The Gaussian noise sample has no digit present.

A purpose of the second experiment was to determine whether soft federated learning could recognise when institutions have useless data, and ignore institutions having useless data.

Figure 12:
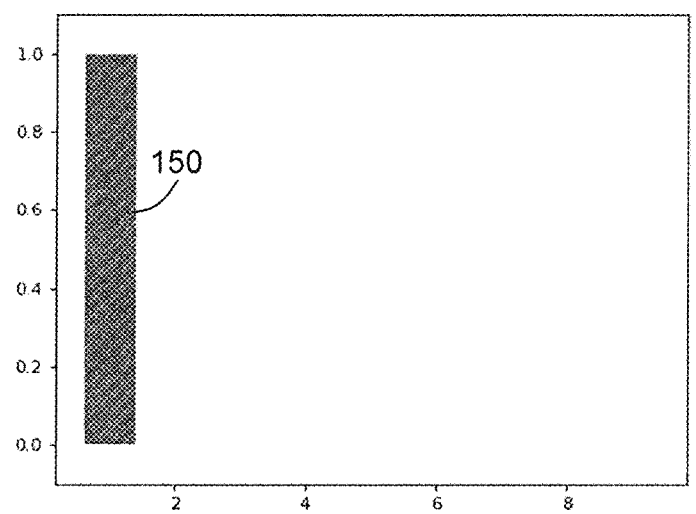
FIG. 12 is a plot of influences obtained in a second experiment using a method in accordance with an embodiment.
Figure 13A:
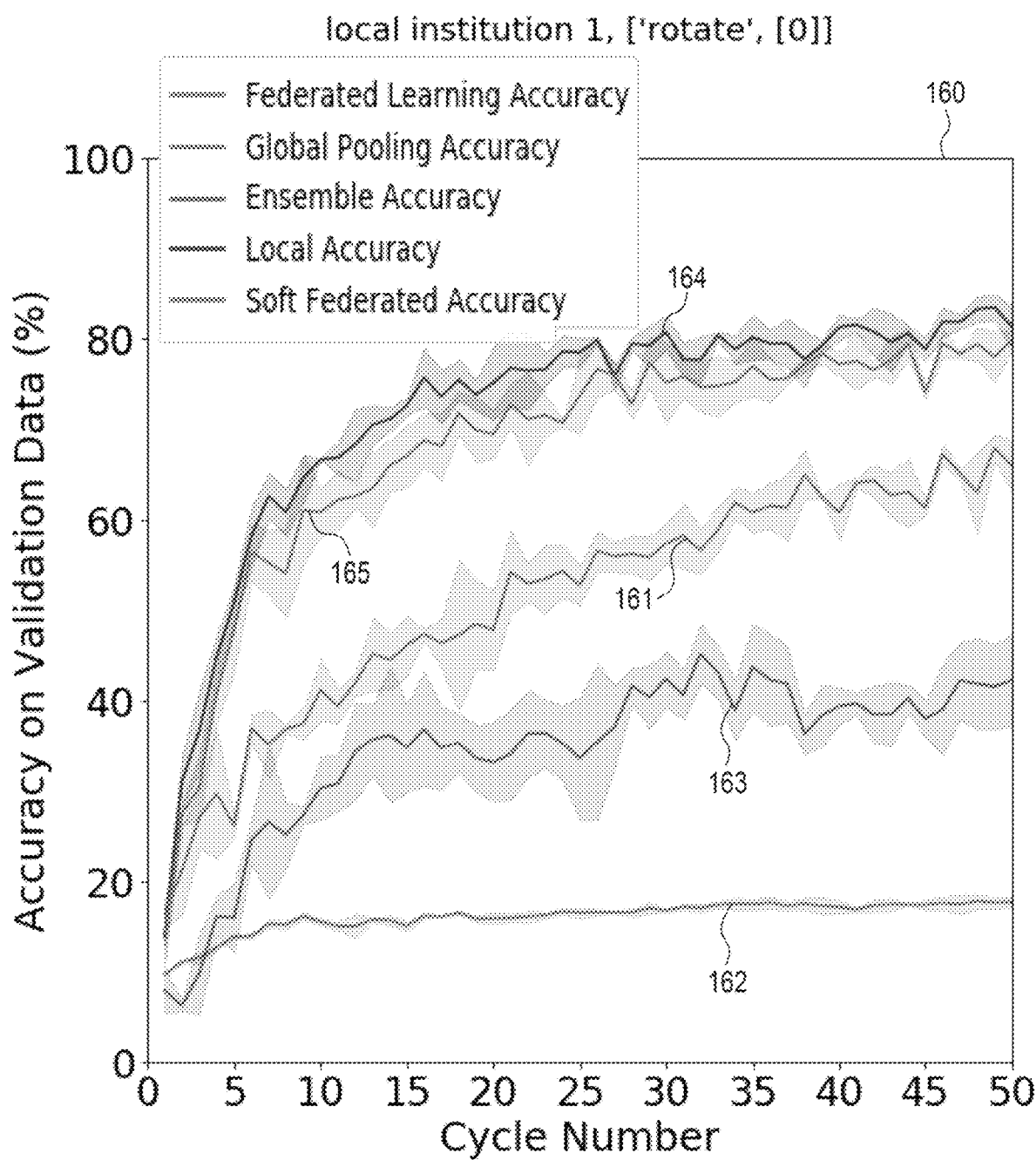
FIGS. 13A, 13B, 13C, 13D, 13E, 13F, 13G, 13H and 13I show plots of results of the second experiment, in which a model is trained on MNIST data using a conventional federated learning method, and using a method in accordance with an embodiment.
Figure 13B:
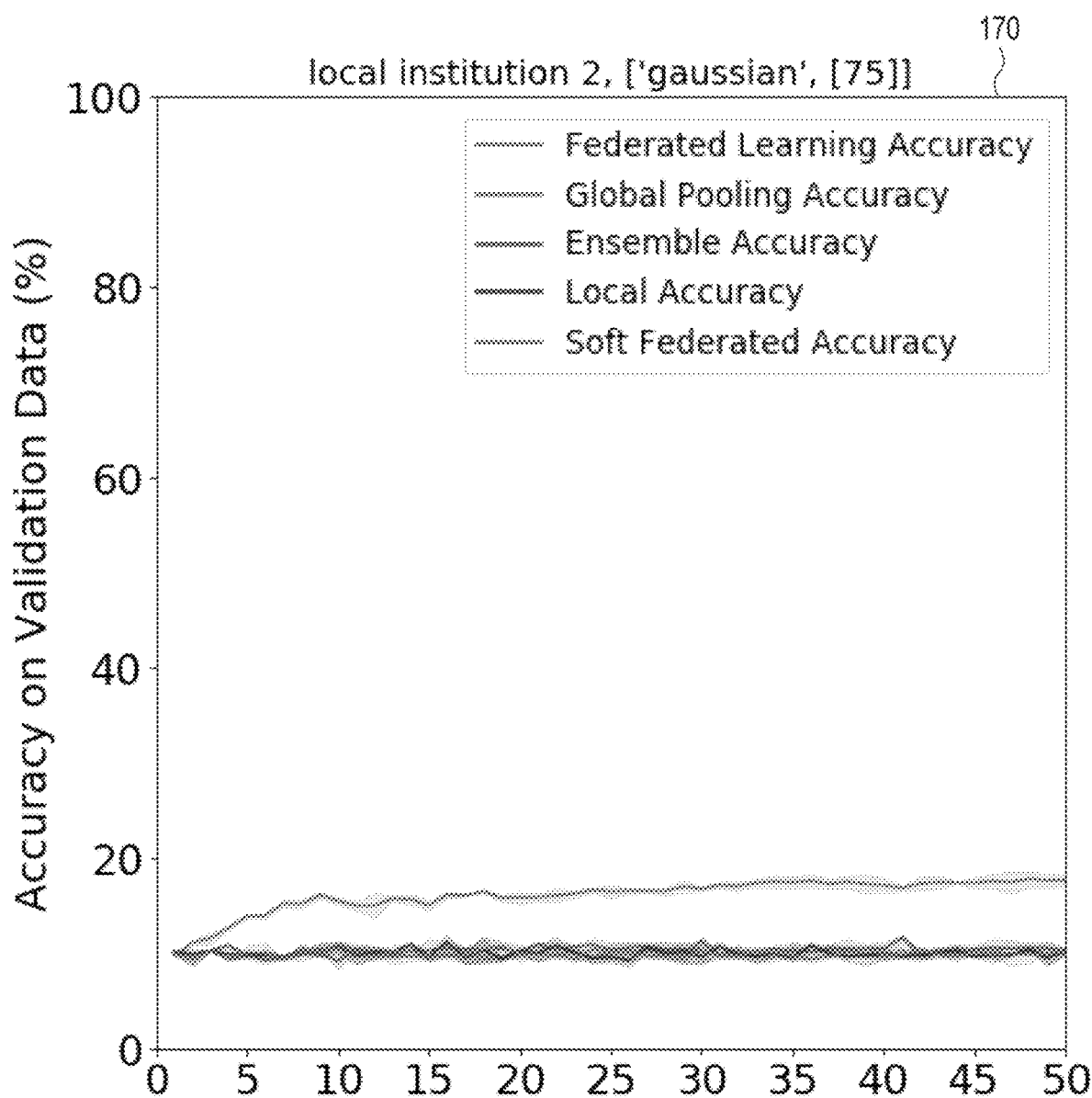
Figure 13C:
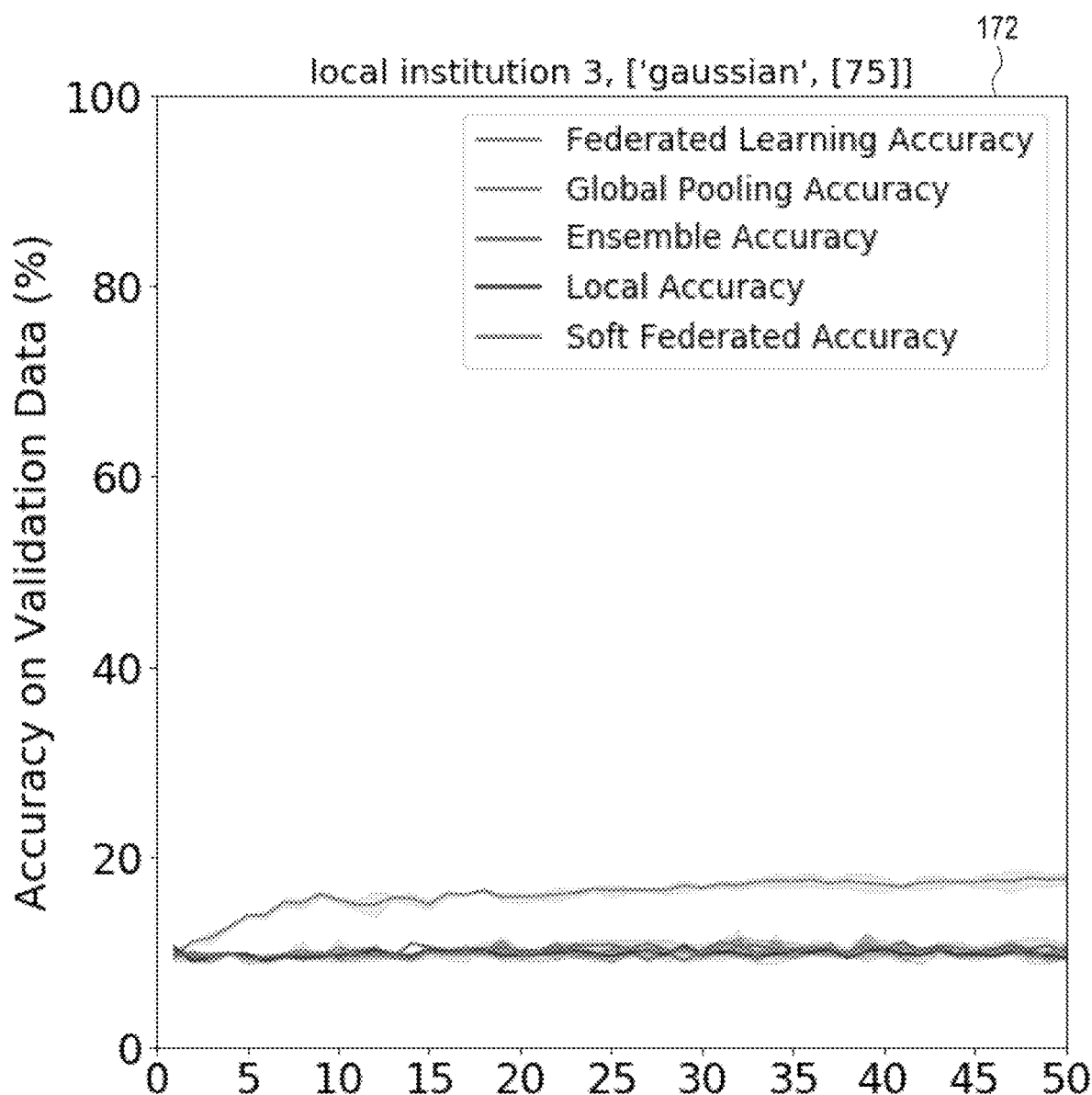
Figure 13D:
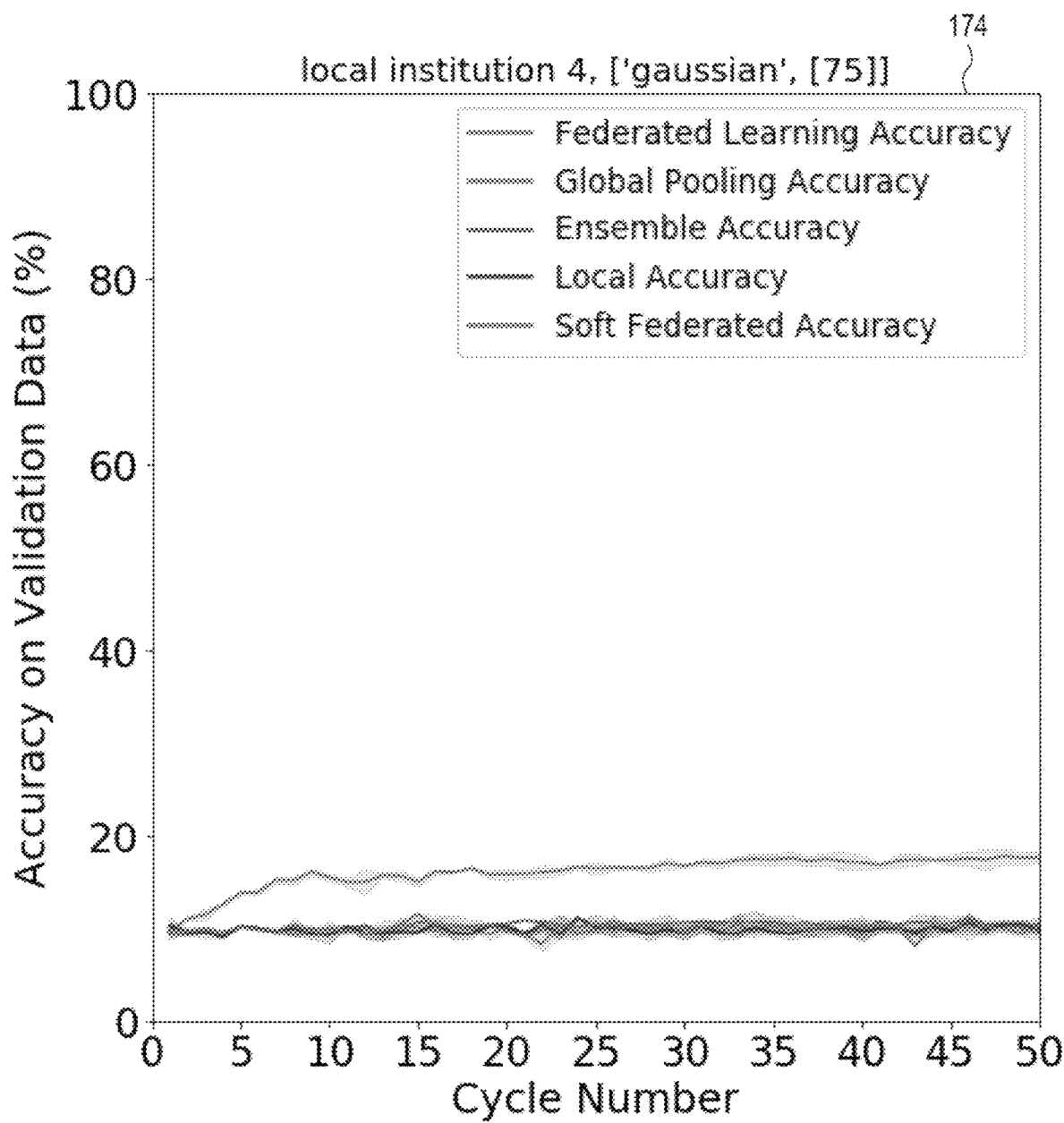
Figure 13E:
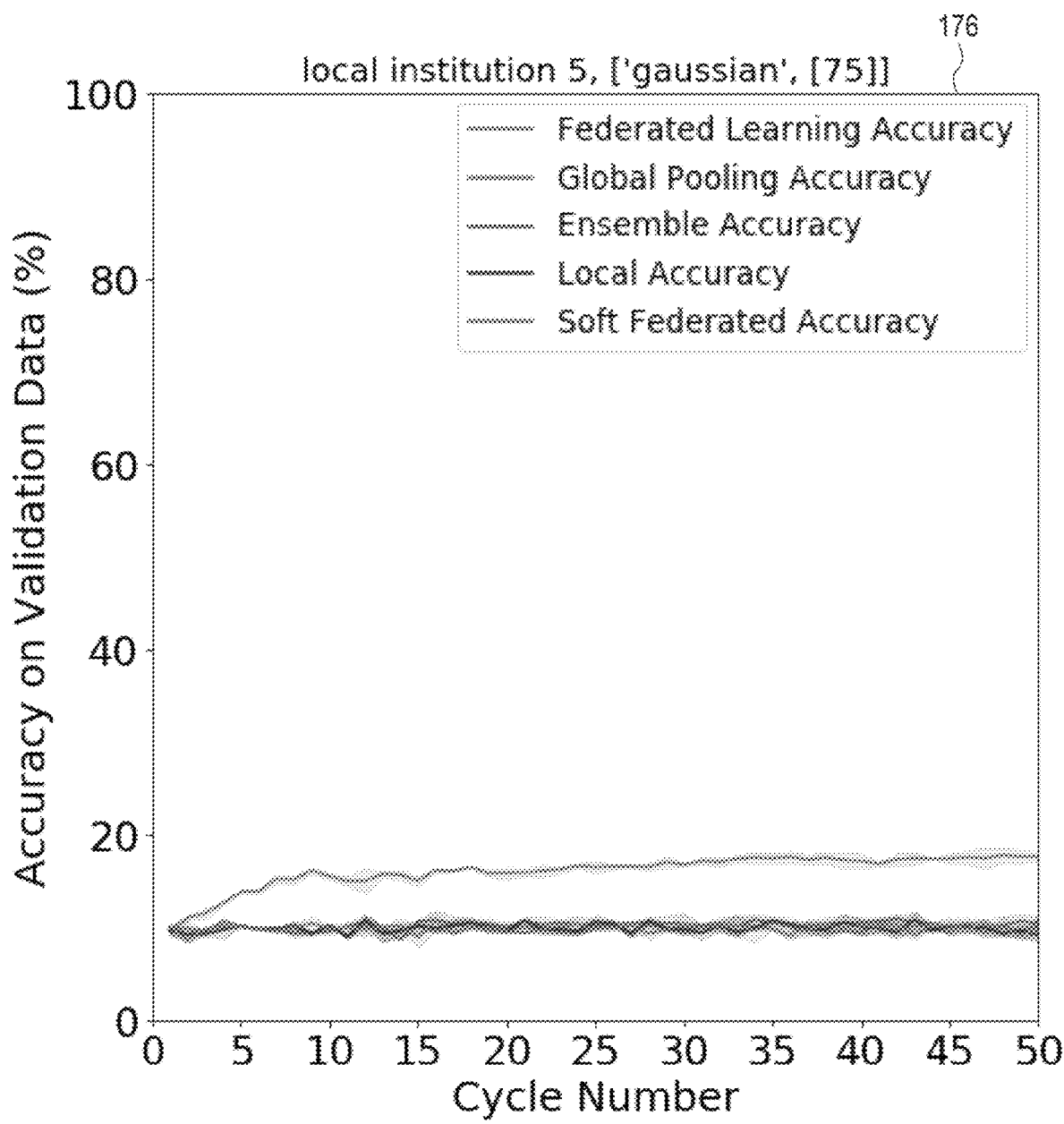
Figure 13F:
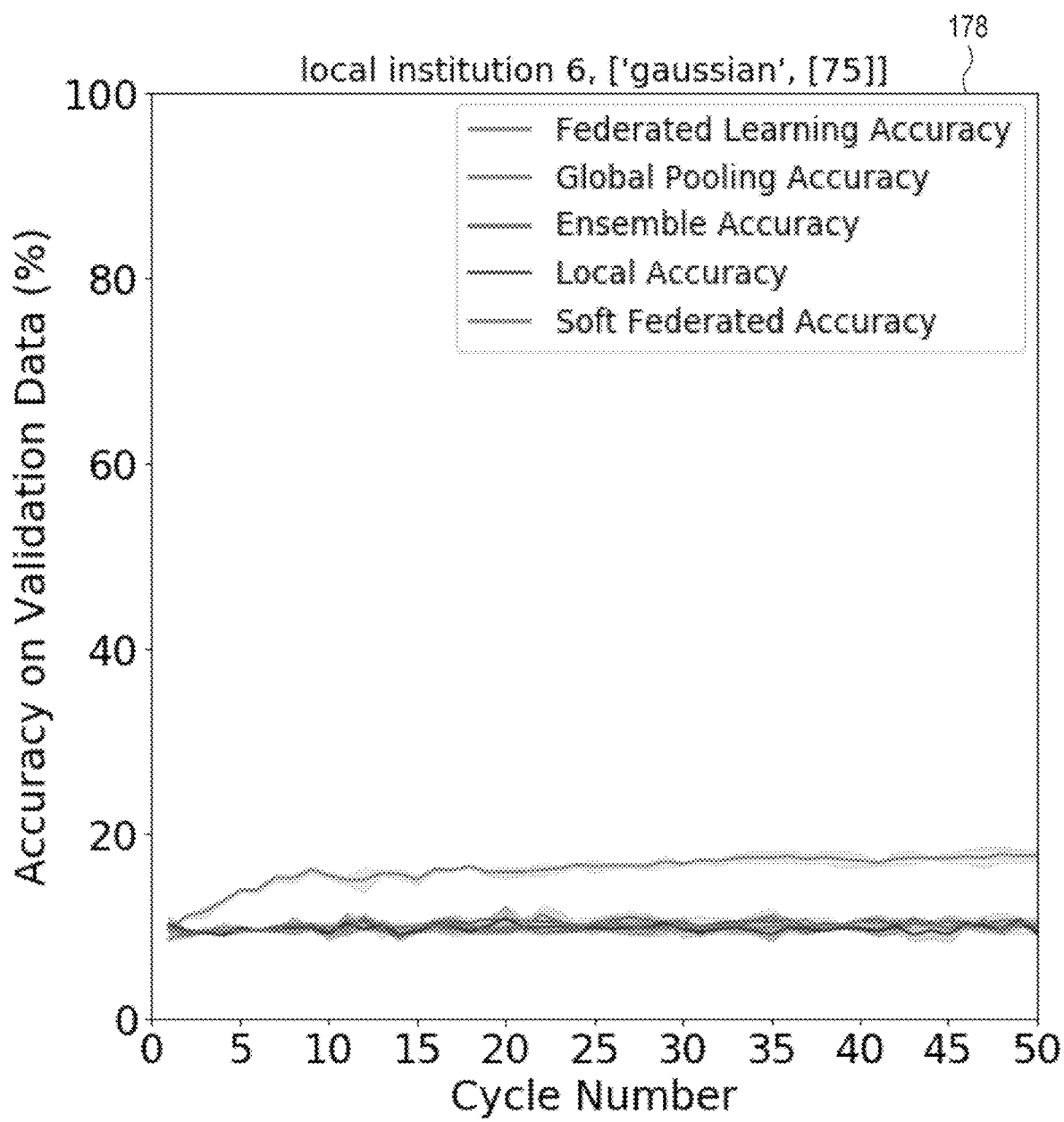
Figure 13G:
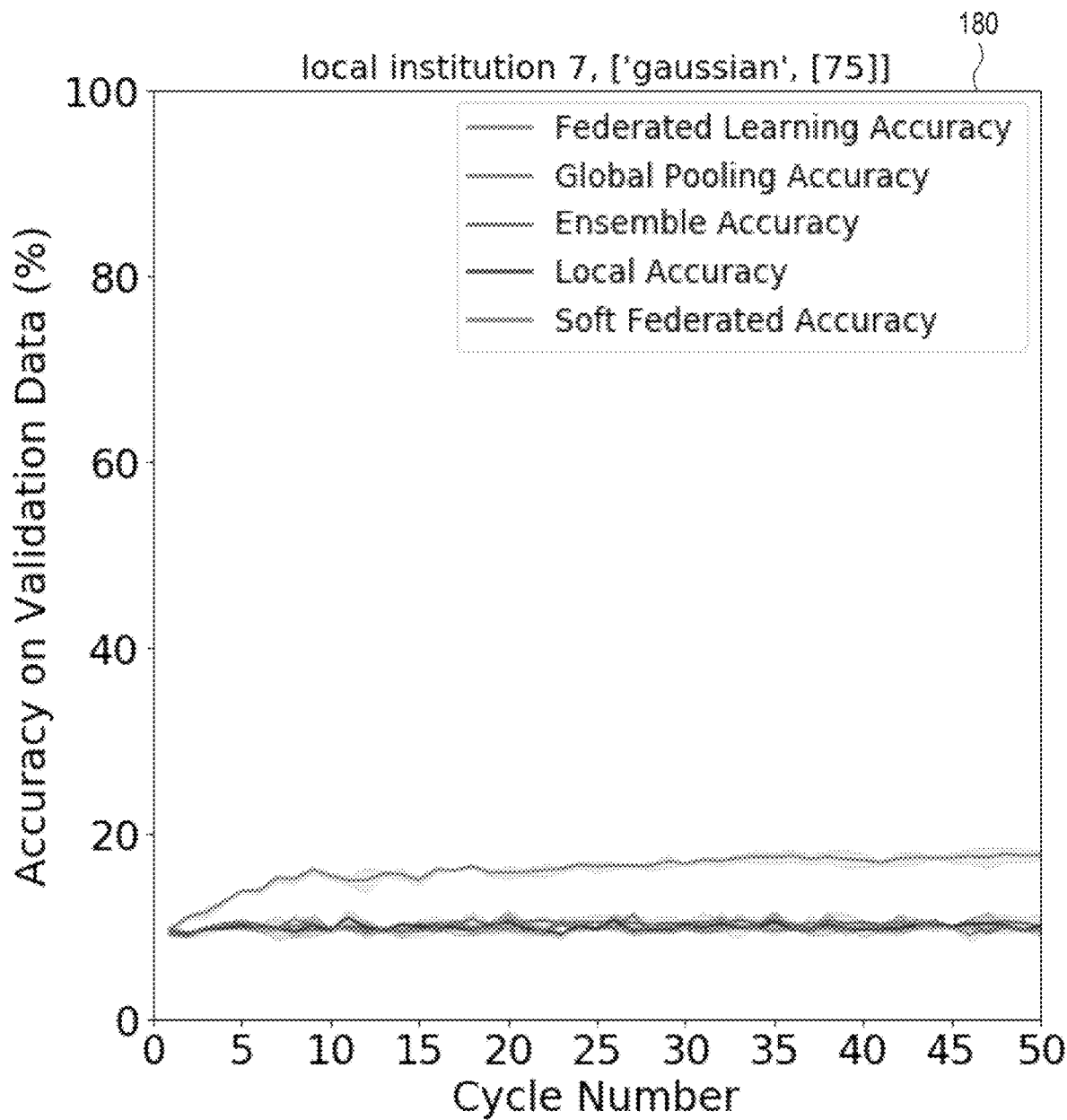
Figure 13H:
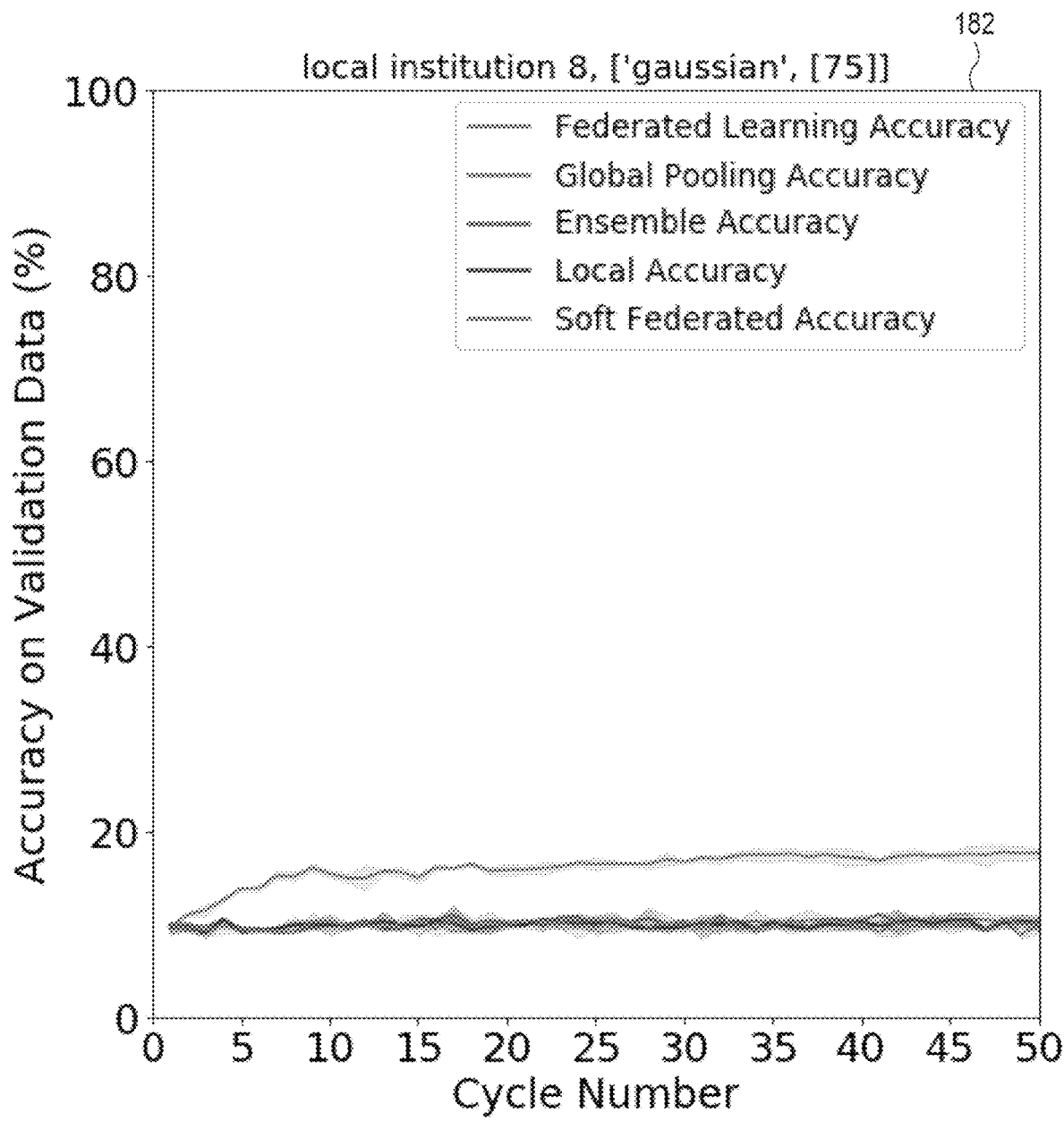
Figure 13I:
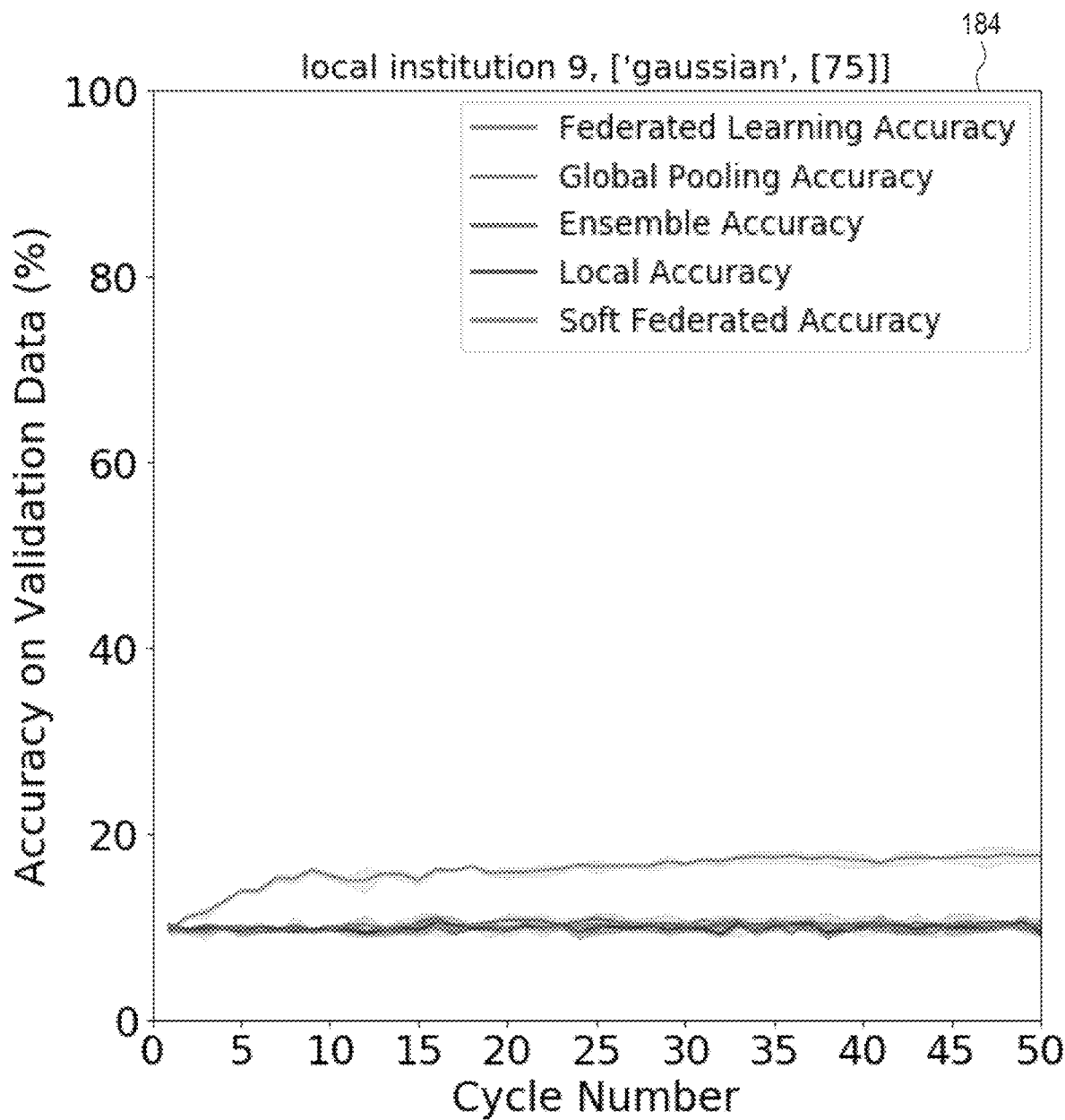

A training procedure was performed for the nine simulated institutions in accordance with the method described above with reference to FIGS. 5 and 7. FIG. 12 is a plot of influence values for the first institution, which was the institution having a cohort of MNIST samples. Institution 1 has an influence value of 1 for its own trained model (bar 150), and has no influence value for any of the models trained at the other institutions. Influence values for the other institutions were found to be random, and are not shown here.

FIGS. 13A through FIG. 13E comprise 9 plots. Each plot shows an accuracy of validation data (as a percentage) against a number of training cycles for a respective one of the 9 simulated institutions of the second experiment.

Plot 160 (FIG. 13A) relates to the first institution, which is the institution having a cohort of MNIST data. The other plots 170 (FIG. 13A), 172 (FIG. 13C), 174 (FIG. 13D), 176 (FIG. 13E), 178 (FIG. 13F), 180 (FIG. 13G), 182 (FIG. 13H), 184 (FIG. 13I) each relate to a respective one of the other institutions, which may be described as noisy institutions. In all the noisy institutions, it may be seen that all results are poor. This is to be expected because there is no signal in their data samples.

On plot 160 (FIG. 13A), line 161 represents a performance of conventional federated learning. Line 162 represents a performance of global pooling. Line 163 is representative of an ensemble accuracy. Line 164 is representative of the local accuracy. Line 165 is representative of a performance of soft federated learning.

In institution 1 (FIG. 13A, 160), a line 165 representing soft federated learning is much higher than a line 161 representing conventional federated learning, proving that using influences leads to an improvement in performance. In the second experiment as shown in FIGS. 13A through FIG. 13E, soft federated learning performs much better than conventional federated learning due to recognising the other institutions as outliers. This highlights a strength of soft federated learning over conventional federated learning.

Line 164 is the performance of a model trained only on the local data. In this case it is slightly better than using the soft federated method. In the first experiment, a model trained only on the local data was found to perform much worse than the soft federated method.

In various further embodiments, a model may be trained at different institutions to obtain different sets of model parameters. The model parameters may be used to determine a degree of similarity between the institutions and/or their data cohorts. For example, influence values may be determined as described above. A high influence value may indicate high similarity. A lower influence value may indicate lower similarity.

In some circumstances, a value of similarity may be determined without then using the value of similarity to weight a set of trained models.

In many cases, influence values are not symmetric. For example, the influence value for model parameters trained at institution A and tested at institution B may not be the same as the influence value for model parameters trained at institution B and tested at institution A. In some embodiment, influence values for a pair of institutions may be combined, for example averaged, to obtain a measure of similarity between the institutions.

In some circumstances, it may be expected that a pair of institutions may be similar. For example, the institutions may have similar scanners and similar patient populations. If the measure of similarity between the institutions is found to be low, the low similarity may indicate an issue at one or both of the institutions, for example an issue with a scanner and/or a data processing method and/or a model training method.

In other circumstances, a pair of institutions may be expected to be dissimilar. For example, the institutions may use different scanners or scanning methods. There may be other differences in the data cohorts.

Figure 14:
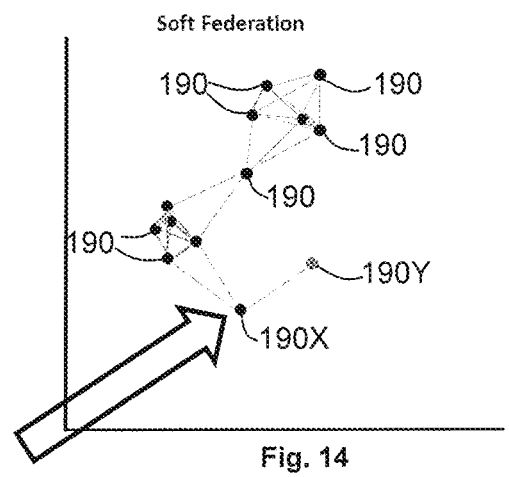
FIG. 14 is a plot in which a federation of institutions are plotted in similarity space.

Similarity between institutions may be plotted in a similarity space. A matrix of influence values between all institutions may be projected into a two-dimensional similarity space via a dimensionality reduction technique. FIG. 14 represents a plurality of institutions 190 as points in similarity space. The similarity space is a space in which distance between points is representative of a similarity between institutions. The similarity space is all relative and has arbitrary scales. The relative distances between the institutions is indicative of the dissimilarity between them.

Institutions that are closer to each other in similarity space are more similar. Institutions that are further from each other in similarity space are less similar. An institution that is not near any other institutions in similarity space may be an outlier.

In FIG. 14, a link is drawn between a pair of institutions if influence values between the two institutions are non-zero. A link may indicate that the two institutions have data cohorts similar enough to receive models from each other.

A representation of the institutions in similarity space (for example, the plot of FIG. 14) may in some circumstances be displayed to a user.

A group of institutions that are used to train a common model may be referred to as a federation.

FIG. 14 also represents the disconnection of an institution 190Y from the federation.

In some circumstances, one or more institutions 190 may be removed from a federation. To remove an institution, the institution's point in similarity space is removed and all connections to the institution are removed. The model within the institution that is removed can continue to train locally without influence from or to the other institutions in the federation.

This may result in some institutions becoming disconnected completely from the federation. In the example of FIG. 14, if the lowest institution 190X is removed, the institution 190Y disconnects and leaves the federation. The institution 190Y does not have non-zero influence values with any institution 190 other than 190X.

Figure 15:
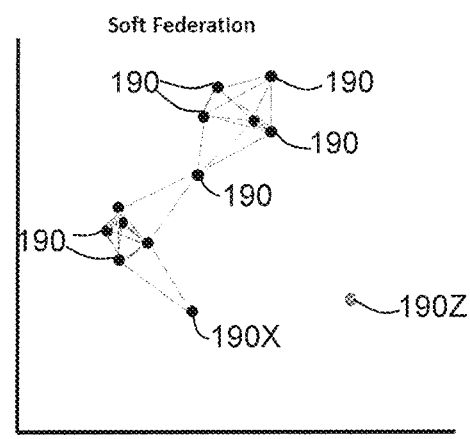
FIG. 15 is a plot showing a federation in which one of the institutions is not connected to the other institutions.

FIG. 15 is representative of a new institution being added to an existing federation. The location of the new institution in similarity space is found by determining influence values with all the other institutions. The new institution is linked up in similarity space to institutions with which it has non-zero influence values. If the new institution connects to at least one other institution, it becomes part of the federation. In the new institution does not connect to any of the other institutions, the institution is rejected. In FIG. 15, institution 190Z does not connect to any of the other institutions and so is rejected.

If a new institution is added to the federation, the new institution receives a model using the usual method when the current federated learning cycle completes. The new institution then participates in subsequent federated learning cycles.

In some circumstances, there may be an institution that is considered to behave as a rogue institution. A rogue institution may be an institution whose data or model are not looking as they should. This could be due to an error in software or hardware being used, incompatibility issues, or simply a human misusing the software (either accidentally or intentionally), leading to invalid ground truth or evaluation.

A rogue institution in conventional federated learning may be a serious risk. The institution could provide incorrect parameters that undermine what the federation is trying to learn. It has particular issues if this institution is a large institution, for example a major hospital that generates a lot of data. In conventional federated learning, a large institution with a lot of data is weighted highly during the model combining.

Under soft federated learning, a rogue institution will quickly be identified as an outlier in the similarity space. The rogue institution will have low influence values. The rogue institution may be disconnected from the federation.

Certain embodiments provide a method of training a model, comprising: receiving a first training model generated based on first training data set acquired in first cohort and a second training model generated based on second training data set acquired in second cohort, calculate a first evaluation value and a second evaluation value by inputting data set acquired in the first cohort to the first training model and the second training model.

The first training model and the second training model may be synthesized based on the first evaluation value and the second evaluation value.

Weights of the first and second training model may be calculated based on the first and second evaluation values and the synthesized procedure may be conducted based on the weights.

Certain embodiments provide a system comprising a plurality of institutions each equipped with apparatus for machine learning, and each having access to a cohort of data. The institutions are connected in a communication network. Institutions communicate updates to their learned parameters, these updates depending on the training cohort at each institution.

The parameter update may be a function of influence between cohorts. Influence may be a function of the performance of a model trained at one institution and tested at another or itself. There may be no need for a central organising server. New institutions may be added or removed at any time.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An apparatus, comprising:
   processing circuitry configured to:
   obtain first trained parameters for a model, wherein the first trained parameters have been generated by training the model using training data from a first data cohort, the training data from the first data cohort including a first plurality of training data sets and a respective set of ground truth data associated with each of the first plurality of training data sets;
   obtain second trained parameters for the model, wherein the second trained parameters have been generated by separately training the model on another apparatus using training data from a second, different data cohort that is available to the other apparatus but is not available to the apparatus, the training data from the second data cohort including a second plurality of training data sets and a respective set of ground truth data associated with each of the second plurality of training data sets;
   determine a first evaluation value by inputting evaluation data from the first data cohort into a model having the first trained parameters, wherein the first evaluation value is representative of a performance of the model having the first trained parameters when applied to evaluation data from the first data cohort; and
   determine a second evaluation value by inputting evaluation data from the first data cohort into a model having the second trained parameters, wherein the second evaluation value is representative of a performance of the model having the second trained parameters when applied to evaluation data from the first data cohort.

2. The apparatus according to claim 1, wherein the processing circuitry is further configured to obtain an updated model by combining the first trained parameters and the second trained parameters.

3. The apparatus according to claim 2, wherein the combination of the first trained parameters and second trained parameters is weighted in accordance with the first evaluation value and the second evaluation value.

4. The apparatus according to claim 1, wherein the processing circuitry is further configured to determine a degree of similarity between the first data cohort and the second data cohort based on the determined first evaluation value and second evaluation value.

5. The apparatus according to claim 1, wherein the performance represented by each evaluation value comprises an accuracy of the model as compared to random chance.

6. The apparatus according to claim 1,
   wherein the first data cohort is held by an entity that is local to the apparatus, and/or
   wherein the first data cohort consists of data acquired at an entity that is local to the apparatus.

7. The apparatus according to claim 6,
   wherein the second data cohort is held by the other apparatus and the other apparatus is remote from the apparatus, and/or
   wherein the second data cohort consists of data acquired at the other apparatus and the other apparatus is remote from the apparatus.

8. The apparatus according to claim 6, wherein the entity that is local to the apparatus comprises or forms part of at least one of an institution, a hospital, a university, and a company.

9. The apparatus according to claim 6, wherein data restrictions are such that the data from the second data cohort is not permitted to be provided to the entity that is local to the apparatus and/or the apparatus is not capable of receiving data from the second data cohort.

10. The apparatus according to claim 3,
    wherein the processing circuitry is further configured to:
    obtain at least one further set of trained parameters obtained by training the model on at least one further data cohort; and determine a respective evaluation value for each further set of trained parameters,
wherein the obtaining of the updated model comprises combining the first trained parameters, the second trained parameters, and the at least one further set of trained parameters, and
wherein the combination is weighted in accordance with the evaluation values.

11. The apparatus according to claim 3, wherein the apparatus is configured to repeat a training cycle iteratively, and the training cycle comprises:
transmitting the updated model to at least one further apparatus;
training the updated model to obtain further trained parameters;
testing the further trained parameters and further trained parameters from the at least one further apparatus; and
obtaining a further updated model by combining the further trained parameters.

12. The apparatus according to claim 1, wherein the model comprises a neural network or a convolutional neural network.

13. The apparatus according to claim 3,
wherein the apparatus is further configured to use the updated model to process a set of data, and
wherein the set of data was not used in training the model.

14. A method comprising:
obtaining first trained parameters for a model, wherein the first trained parameters have been generated by training the model using training data from a first data cohort, the training data from the first data cohort including a first plurality of training data sets and a respective set of ground truth data associated with each of the first plurality of training data sets;
obtaining second trained parameters for the model, wherein the second trained parameters have been generated by separately training the model on another apparatus using training data from a second, different data cohort that is available to the other apparatus but is not available to the apparatus, the training data from the second data cohort including a second plurality of training data sets and a respective set of ground truth data associated with each of the second plurality of training data sets;
determining a first evaluation value by inputting evaluation data from the first data cohort into a model having the first trained parameters, wherein the first evaluation value is representative of a performance of the model having the first trained parameters when applied to evaluation data from the first data cohort; and
determining a second evaluation value by inputting evaluation data from the first data cohort into a model having the second trained parameters, wherein the second evaluation value is representative of a performance of the model having the second trained parameters when applied to evaluation data from the first data cohort.

15. An apparatus, comprising:
processing circuitry configured to:
receive a data set for processing; and
automatically process the data set to obtain a desired output,
wherein the processing of the data set comprises using a model trained in accordance with the method of claim 14.

16. A system comprising:
a plurality of training apparatuses, each associated with a respective entity and each having access to a respective cohort of data held by said entity; and
a communications network connecting the plurality of training apparatuses;
wherein the training apparatus for each entity comprises processing circuitry configured to:
train a model on training data from the cohort of data at said entity, thereby to obtain a set of trained parameters, the training data from the cohort of data at said entity including a first plurality of training data sets and a respective set of ground truth data associated with each of the first plurality of training data sets;
receive other trained parameters from the other training apparatuses, the other trained parameters having been obtained by training the model on the other training apparatuses using training data, from the respective cohort of data held by each other entity, that is not available to said entity, the training data, from the respective cohort of data held by each other entity, including a second plurality of training data sets and a respective set of ground truth data associated with each of the second plurality of training data sets; and
determine a respective evaluation value for each set of the other trained parameters by inputting evaluation data from the cohort of data into a model having said set of the other trained parameters, the respective evaluation value being representative of a performance of the model having the other trained parameters when applied to evaluation data from the cohort of data.

17. The system according to claim 16,
wherein the processing circuitry of the training apparatus at each entity is further configured to obtain a respective updated model for that entity by combining the other trained parameters, and
wherein the combination of the other trained parameters is weighted in accordance with the evaluation values obtained at that entity.

18. A method for training a model comprising:
training a model by a respective apparatus at each of a plurality of entities, wherein the training at each of the plurality of entities is performed on a respective training data cohort held at said entity and only available to said entity, wherein the training is to obtain respective set of trained parameters from each of the entities, and wherein each of the respective training data cohorts includes a plurality of training data sets and a respective set of ground truth data associated with each of the plurality of training data sets;
transmitting, by the respective apparatus at each of the plurality of entities, the set of trained parameters for said entity to each other one of the plurality of entities; and
determining, by the respective apparatus at each of the plurality of entities, a respective evaluation value for each of the sets of trained parameters by inputting evaluation data from the data cohort at that entity into a model having said set of trained parameters, wherein the respective evaluation value is representative of a performance of the model having the said set of trained parameters when applied to evaluation data from the data cohort.

19. The method according to claim 18, the method further comprising obtaining, by a respective apparatus at each entity, a respective updated model by combining the sets of trained parameters, wherein the combination of the sets of trained parameters at each entity is weighted in accordance with the evaluation values obtained at that entity.

\* \* \* \* \*